(12) United States Patent
Tarighat Mehrabani

(10) Patent No.: US 11,954,936 B2
(45) Date of Patent: Apr. 9, 2024

(54) CROSS-CORRELATION SYSTEM AND METHOD FOR SPATIAL DETECTION USING A NETWORK OF RF REPEATERS

(71) Applicant: AR & NS Investment, LLC, Newport Coast, CA (US)

(72) Inventor: Alireza Tarighat Mehrabani, Los Angeles, CA (US)

(73) Assignee: AR & NS Investment, LLC, Newport Coast, CA (US)

( * ) Notice: Subject to any disclaimer, the term of this patent is extended or adjusted under 35 U.S.C. 154(b) by 0 days.

(21) Appl. No.: 16/910,537

(22) Filed: Jun. 24, 2020

(65) Prior Publication Data
US 2021/0405759 A1      Dec. 30, 2021

(51) Int. Cl.
| | |
|---|---|
| G06V 40/10 | (2022.01) |
| G06F 3/01 | (2006.01) |
| G06F 18/25 | (2023.01) |
| G06V 40/20 | (2022.01) |
| H04W 4/70 | (2018.01) |

(Continued)

(52) U.S. Cl.
CPC ............ G06V 40/103 (2022.01); G06F 3/017 (2013.01); G06F 18/25 (2023.01); G06V 40/28 (2022.01); H04W 4/70 (2018.02); H04W 8/005 (2013.01); H04W 64/003 (2013.01)

(58) Field of Classification Search
CPC ....... G06F 3/017; G06F 18/25; G06K 9/6288; G06V 40/103; G06V 40/28; H04W 4/70; H04W 8/005; H04W 64/003
See application file for complete search history.

(56) References Cited

U.S. PATENT DOCUMENTS

| | | | |
|---|---|---|---|
| 8,346,091 B2 | 1/2013 | Kummetz et al. | |
| 9,661,470 B1 * | 5/2017 | Du Bois | ................. G01S 17/86 |
| 10,180,729 B2 * | 1/2019 | Park | ...................... B60K 35/00 |

(Continued)

FOREIGN PATENT DOCUMENTS

| | | | | |
|---|---|---|---|---|
| WO | 2020166253 A1 | 8/2020 | | |
| WO | WO-2020166253 A1 * | 8/2020 | .......... | B60W 60/001 |

OTHER PUBLICATIONS

Corrected Notice of Allowance for U.S. Appl. No. 16/910,413 dated Feb. 23, 2022.

(Continued)

*Primary Examiner* — Justin R. Blaufeld
(74) *Attorney, Agent, or Firm* — CHIP LAW GROUP

(57) ABSTRACT

A cross-correlation system includes control circuitry that obtains first sensor data of a first user from a radio detection and ranging system. A first portable device carried by the first user is detected based on the first sensor data of the first user. Second sensor data is obtained from the first portable device based on the detection of the first portable device of the first user. The first sensor data and the second sensor data are cross-correlated to obtain cross-correlated information of the first user. A first gesture specific to the first user is recognized based on the cross-correlated information. A first controllable device is identified from a plurality of controllable devices and a first action that is to be executed at the identified first controllable device, based on the first gesture. The identified first controllable device is controlled to execute the first action based on the first gesture.

19 Claims, 6 Drawing Sheets

(51) Int. Cl.
*H04W 8/00* (2009.01)
*H04W 64/00* (2009.01)

(56) References Cited

U.S. PATENT DOCUMENTS

| | | | | |
|---|---|---|---|---|
| 10,872,453 | B2* | 12/2020 | Yokokawa | ............... G06F 3/014 |
| 11,476,894 | B2 | 10/2022 | Mehrabani | |
| 11,764,829 | B2 | 9/2023 | Mehrabani | |
| 2013/0290911 | A1* | 10/2013 | Praphul | .................. G06F 3/038 |
| | | | | 715/863 |
| 2015/0077336 | A1* | 3/2015 | Elangovan | ............... G06F 3/014 |
| | | | | 345/156 |
| 2015/0363035 | A1* | 12/2015 | Hinckley | ............ G06F 3/04883 |
| | | | | 345/173 |
| 2016/0143079 | A1* | 5/2016 | Yoon | ..................... H04W 8/005 |
| | | | | 455/41.1 |
| 2016/0203362 | A1* | 7/2016 | Huang | .................... G06F 21/32 |
| | | | | 726/19 |
| 2017/0018831 | A1 | 1/2017 | Henry et al. | |
| 2017/0097413 | A1* | 4/2017 | Gillian | ................ G06F 21/6245 |
| 2018/0115080 | A1 | 4/2018 | Hussain et al. | |
| 2019/0280759 | A1 | 9/2019 | Bennett et al. | |
| 2019/0313386 | A1 | 10/2019 | Hwang et al. | |
| 2020/0052950 | A1 | 2/2020 | Manolakos et al. | |
| 2020/0091608 | A1 | 3/2020 | Alpman et al. | |
| 2020/0134899 | A1* | 4/2020 | Yokokawa | ............ G06F 3/0346 |
| 2020/0294318 | A1* | 9/2020 | Ernst | ....................... G06F 18/25 |
| 2020/0334452 | A1* | 10/2020 | Gurbuz | .................... G01S 7/354 |
| 2020/0350980 | A1 | 11/2020 | Rofougaran et al. | |
| 2020/0366363 | A1 | 11/2020 | Li et al. | |
| 2021/0373919 | A1* | 12/2021 | Davenport | ............ H04L 67/306 |
| 2022/0089179 | A1* | 3/2022 | Sakamoto | ................ G01S 7/417 |

OTHER PUBLICATIONS

Final Office Action for U.S. Appl. No. 16/910,291 dated Jan. 24, 2022.
Final Office Action for U.S. Appl. No. 17/114,437 dated Jan. 14, 2022.
Non-Final Office Action for U.S. Appl. No. 16/910,291 dated Aug. 16, 2021.
Notice of Allowance for U.S. Appl. No. 16/911,036 dated May 25, 2021.
Supplemental Notice of Allowance for U.S. Appl. No. 16/911,036 dated Aug. 19, 2021.
Corrected Notice of Allowance for U.S. Appl. No. 16/911,036 dated Sep. 15, 2021.
Non-Final Office Action for U.S. Appl. No. 17/114,437 dated Sep. 30, 2021.
Notice of Allowance for U.S. Appl. No. 16/910,413 dated Sep. 22, 2021.
Notice of Allowance for U.S. Appl. No. 17/114,437 dated May 4, 2022.
Supplemental Notice of Allowance for U.S. Appl. No. 17/114,437 dated Aug. 3, 2022.
Corrected Notice of Allowance for U.S. Appl. No. 16/910,291 dated Dec. 7, 2022.
Non-Final Office Action for U.S. Appl. No. 17/819,894 dated Dec. 7, 2022.
Notice of Allowance for U.S. Appl. No. 16/910,291 dated Nov. 4, 2022.
Notice of Allowance for U.S. Appl. No. 17/409,128 dated Sep. 21, 2022.
Notice of Allowance for U.S. Appl. No. 17/563,168 dated Oct. 26, 2022.
Supplemental Notice of Allowance for U.S. Applicaiton U.S. Appl. No. 17/114,437 dated Sep. 19, 2022.
Notice of Allowance for U.S. Appl. No. 17/819,894 dated Mar. 22, 2023.
Corrected Notice of Allowance for U.S. Appl. No. 18/068,814 dated May 5, 2023.
Notice of Allowance for U.S. Appl. No. 18/068,814 dated Apr. 26, 2023.
Notice of Allowance for U.S. Appl. No. 18/161,928 dated Jul. 28, 2023.
Non-Final Office Action for U.S. Appl. No. 18/358,143 dated Feb. 15, 2024.

* cited by examiner

CROSS-CORRELATION SYSTEM AND METHOD FOR SPATIAL DETECTION USING A NETWORK OF RF REPEATERS

CROSS-REFERENCE TO RELATED APPLICATIONS/INCORPORATION BY REFERENCE

None.

FIELD OF TECHNOLOGY

Certain embodiments of the disclosure relate to communication systems. More specifically, certain embodiments of the disclosure relate to a cross-correlation system and method for spatial detection using a network of RF repeaters.

BACKGROUND

Currently, certain communication devices, such as Internet-of-Things (IoT) devices depend on high-speed Internet access to the cloud to send sensor data and receive instructions from cloud either directly or via a gateway device. The number of wireless sensors and IoT devices are rapidly increasing with the increase in smart homes, smart offices, enterprises, etc. Existing communication systems are unbale to handle such massive number of wireless sensors and IoT devices and their quality-of-service (QoS) requirements. Further, some of the communication devices may not support cellular communication or wireless-fidelity (Wi-Fi) or may support some other communication protocols (e.g. Bluetooth low energy protocol only). In such cases, it is extremely difficult and technically challenging to support these devices having different communication capabilities and connectivity needs. In certain scenarios, different users have different needs and preferences to remotely interact with such massive number of wireless sensors and IoT devices. For example, gesture control may be used to remotely interact with a device. However, there are several technical challenges in existing gesture control technologies in terms of accuracy of recognition, speed of recognition, and communication reliability. Moreover, existing gesture control technologies have special requirements to function properly. For example, a predefined distance and a dedicated empty space is usually required for user detection and the user subject identification. Multiple users may confuse the conventional systems. Additionally, latency is another technical problem with existing communication systems and network architecture and such latency increases when more wireless access points or relay nodes are introduced in the network.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A cross-correlation system and method for spatial detection using a network of RF repeaters, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a cross-correlation system and method for spatial detection using a network of RF repeaters. The cross-correlation system and method of the present disclosure enables not only improved data transfer rates between at least two communication devices as compared to existing wireless systems (e.g. conventional wireless local area networks), but also enables almost near zero latency communication and an always-connected experience. The cross-correlation system is capable of handling different wired and wireless communication protocols concurrently for providing spatial. The cross-correlation system utilizes the sensor data (e.g. spatial point cloud data) of a body of a user obtained from a radio detection and ranging system to initiate cross-correlation with other sensor data and identify a user with low-complexity.

Typically, in conventional systems, a single device is configured for gesture control with well-defined and pre-configured gestures. Existing gesture-based control systems are not designed or suited to handle massive number of wireless sensors and IoT devices and their quality-of-service (QoS) requirements. Thus, the problems associated with existing systems is quantified, where the accuracy of recognition, speed of recognition, and communication reliability is significantly degraded in existing systems. Moreover, existing gesture control technologies have special requirements to function properly, and latency introduced or delay in any process, such as recognition or communication with relevant device in which some action is to be performed, is generally not acceptable and does not satisfy the QoS requirements. In contradiction to existing systems, the cross-correlation system is able to quickly and accurately identify a correct controllable device from hundreds of controllable devices and at the same time is also able to identify a specific action that is to be executed at the identified controllable device based on a single gesture, thereby improving the system performance in terms of accuracy of recognition, speed of recognition, and communication reliability while significantly reducing communication latency. In the following description, reference is made to the accompanying drawings, which form a part hereof, and in which is shown, by way of illustration, various embodiments of the present disclosure.

Figure 1:
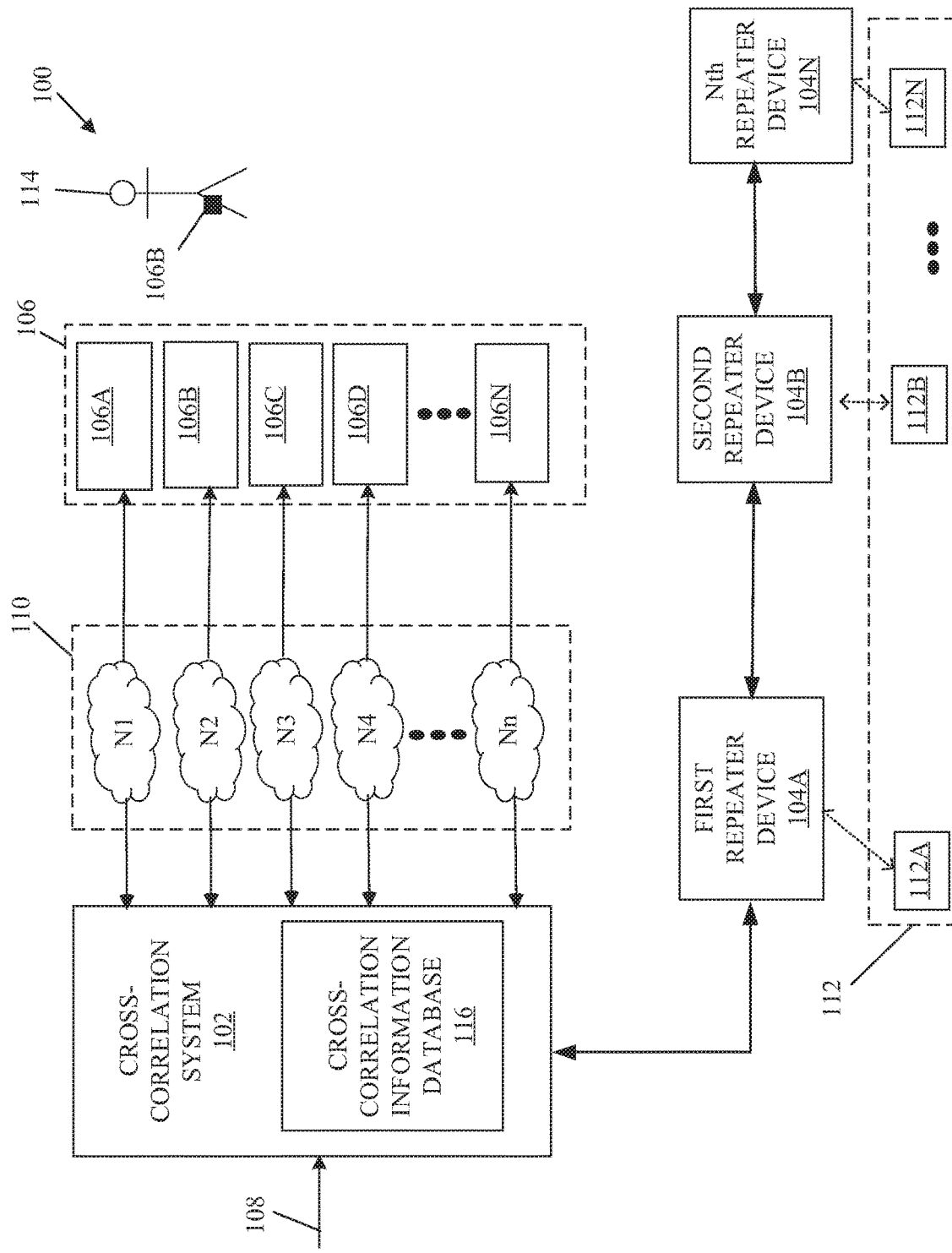
FIG. 1 is a network environment of an exemplary cross-correlation system with cascaded repeater devices, in accordance with an exemplary embodiment of the disclosure.

FIG. 1 is a network environment of an exemplary cross-correlation system with cascaded repeater devices, in accordance with an exemplary embodiment of the disclosure. With reference to FIG. 1, there is shown a network environment 100. The network environment 100 may include a cross-correlation system 102, a plurality of cascaded repeater devices 104A to 104N (namely, a first repeater device 104A, a second repeater device 104B, and an Nth repeater device 104N), a plurality of communication systems 106, a first type of communication network 108, and a plurality of different type of networks 110. There is further shown a plurality of controllable devices 112 communicatively coupled to different repeater devices of the plurality of cascaded repeater devices 104A to 104N. For example, a first controllable device 112A is communicatively coupled to the first repeater device 104A, a second controllable device 112B is communicatively coupled to the second repeater device 104B, and an Nth controllable device 112N is communicatively coupled to the Nth repeater device 104N. There is also shown a first user 114 who may be carrying a first portable device 106B.

In an implementation, the cross-correlation system 102 may be a networking hardware that acts a gateway (or a mediator) between the first type of communication network 108 (e.g. Internet or a core network) and the plurality of different type of networks 110. The cross-correlation system 102 includes suitable logic, circuitry, and interfaces that may be configured to acquire sensor data from different sensors and systems, such as a radio detection and ranging system 106A, the first portable device 106B, an image-capture device 106C, and a plurality of user-devices 106D, ..., 106N, of the plurality of communication systems 106. In some embodiments, the cross-correlation system 102 may be configured to provide access to the first type of communication network 108 to the plurality of communication systems 106. The plurality of communication systems 106 may be communicatively coupled to the cross-correlation system 102 via the plurality of different type of networks 110. The cross-correlation system 102 may be a multiprotocol wireless range extender device that has a capability to extend range of different radio frequency signals communicated over a plurality of different communication protocols (e.g. Wi-Fi, Bluetooth, Zigbee, cellular signals, and other wireless communication protocols) at the same time. Examples of the cross-correlation system 102 may include, but is not limited to a home automation system, a gesture and network controller, a home gateway device, a fifth generation (5G) modem, a backplane system, an evolved-universal terrestrial radio access-new radio (NR) dual connectivity (EN-DC) device, a 5G wireless access point, an advanced router, a bridge router, a fixed wireless access (FWA) device, a server, a firewall device, or a network security device.

Each of the plurality of cascaded repeater devices 104A to 104N includes suitable logic, circuitry, and interfaces that may be configured to communicate with the cross-correlation system 102 and one or more other repeater devices of the plurality of cascaded repeater devices 104A to 104N. For example, the first repeater device 104A may be configured to communicate with the cross-correlation system 102, and one or more of other repeater devices of the plurality of cascaded repeater devices 104A to 104N in a parallel transmission or a chain transmission. In an implementation, in order to execute the chain transmission, the first repeater device 104A may communicate any radio frequency signal received from the cross-correlation system 102 further to the second repeater device 104B, which in turn may further communicate the radio frequency signal to a further repeater device, such as the Nth repeater device 104N. Examples of the each of the plurality of cascaded repeater devices 104A to 104N (such as the first repeater device 104A) may include, but is not limited to a 5G wireless access point, a multiprotocol wireless range extender device, an evolved-universal terrestrial radio access-new radio (NR) dual connectivity (EN-DC) device, a NR-enabled repeater device, a NR-enabled repeater device, a wireless local area network (WLAN)-enabled device, or a wireless personal area network (WPAN)-enabled device.

Each of the plurality of communication systems 106 includes suitable logic, circuitry, and interfaces that may be configured to communicate with the cross-correlation system 102. The plurality of communication systems 106 may be communicatively coupled to the cross-correlation system 102 via the plurality of different type of networks 110 (i.e. via wireless or wired medium). Each of the plurality of communication systems 106 may be configured to communicate with the cross-correlation system 102 in a plurality of different range of frequencies, such as 2.4 GHz, 5 GHz, sub 6 GHz bands, or above 6 GHz bands (e.g. mmWave frequencies). In an implementation, the plurality of communication systems 106 may access the first type of communication network 108 (e.g. the Internet) via the cross-correlation system 102 for data communication in a multi-gigabit data rate. Examples of the plurality of communication systems 106 may include, but is not limited to the radio detection and ranging system 106A, the first portable device 106B, the image-capture device 106C, and the plurality of user-devices 106D, ..., 106N. For example, the plurality of communication systems 106 may further include one or more wireless access points (e.g. a 2.4 GHz based wireless access point and a 5 GHz multiple input multiple output) MIMO capable wireless access point), an Internet-of-Things (IoT) controller, an IoT device, a controllable device, a Wi-Fi only device, a Bluetooth only device, a Zigbee only device, an orthogonal frequency division multiplexing (OFDM) communication system, a cellular communication system, such as a 2G, 3G, 4G, or 5G NR-enabled communication system.

In an implementation, the first type of communication network 108 may be a wired network, such as an optical fiber connection, which provides high-speed access (e.g. multi-gigabits data rate) to a core network, for example, Internet. In another implementation, the first type of communication network 108 may be a 5G cellular communication network having high data transfer rate (i.e. multi-gigabits data rate).

The plurality of different type of networks 110 (e.g. N1 to Nn) correspond to a hybrid network, which may include both wired and wireless networks. In an example, the plurality of different type of networks 110 may include a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, an Internet-of-Things network, a wired network, or other wireless network.

Each of the plurality of controllable devices 112 refers to a consumer electronic device that can be remotely operated. Each of the plurality of controllable devices 112 includes suitable logic, circuitry, and interfaces that may be configured to communicate with the cross-correlation system 102. Based on a specific instruction received for a specified time period from the cross-correlation system 102, the controllable device for which the specific instruction is meant, executes a sequence of actions for the specified time period. Examples of each of the plurality of controllable devices 112 include, but is not limited to a smart television, an audio system, a lighting system, a consumer appliance, an IoT device, or a device that operates when communicating in a specific protocol, for a BLE-only, a Wi-Fi only, a Zigbee-only protocol, and the like.

The cross-correlation information database 116 may be configured to store a user identifier of each user of a plurality of users (e.g. the first user 114). The cross-correlation information database 116 may be further configured to store user information, such as age, height, body shape, and the like, which may be used for quick user identification. The cross-correlation information database 116 further stores cross-correlated information of each user, such as the first user 114. The cross-correlated information refers to different sensor data obtained from different sensors or devices (e.g. the plurality of communication devices 106) for different users, which is then cross-correlated and stored in the cross-correlation information database 116.

In operation, the cross-correlation system 102 may be communicatively coupled to the first type of communication network 108. In an implementation, the cross-correlation system 102 may be connected to a modem. In another implementation, the cross-correlation system 102 may be integrated with the modem (i.e. the functionalities of a modem (e.g. a Wi-Fi modem) may be integrated with the cross-correlation system 102). The plurality of communication systems 106 includes at least the radio detection and ranging system 106A, the first portable device 106B, the image-capture device 106C, and the plurality of user-devices 106D, . . . , 106N. The cross-correlation system 102 may be configured to provide access to the first type of communication network 108 to the plurality of communication systems 106 that are communicatively coupled to the cross-correlation system 102 via the plurality of different type of networks 110. The plurality of different type of networks 110 correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network.

In an example, the plurality of different type of networks 110 may include a first Wi-Fi network operating in a first frequency, a second Wi-Fi network operating in a second frequency that is different from the first frequency, or other low power Wi-Fi network (such as IEEE 802.11ah, also known as Wi-Fi "HaLow" or other variation of Wi-Fi based on IEEE 802.11), a Bluetooth network, a Bluetooth low energy (BLE) network, a wireless sensor network (e.g. adaptive network topology based network), a Zigbee network, a cellular network, an infrared communication, a radio frequency for consumer electronics (RF4CE), a citizens broadband radio service (CBRS) network, other short-range wireless communication network, such as a wireless personal area network, or even a wired network. For example, some of the communication systems (e.g. the image-capture device 106C) of plurality of communication systems 106 may be connected over a wired medium (e.g. N3).

In accordance with an embodiment, the cross-correlation system 102 may be further configured to obtain a plurality of radio frequency signals corresponding to different communication protocols from the plurality of communication systems 106. The plurality of radio frequency signals corresponds to a citizens broadband radio service (CBRS) signal, a wireless wide area network (WWAN) signal, a wireless local area network (WLAN) signal, a wireless personal area network (WPAN) signal, or a combination thereof. The plurality of radio frequency signals corresponding to different communication protocols may be obtained via the plurality of different type of networks 110. The different communication protocols may correspond to (i.e. may include) a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, a citizens broadband radio service (CBRS) protocol, or different variations of wireless wide area network (WWAN), wireless local area network (WLAN), wireless personal area network (WPAN) protocols, or other types of wired or wireless communication protocols.

The cross-correlation system 102 may be configured to obtain first sensor data of the first user 114 from the radio detection and ranging system 106A. The first sensor data may be obtained via one of the plurality of different type of networks 110. The first sensor data may be a spatial point cloud data of a body of the first user 114. For example, three-dimensional (3D) point cloud data of the body of the first user 114. It may be generally difficult to reliably identify a user, such as the first user 114, from the radar data alone (i.e. the obtained first sensor data). The cross-correlation system 102 may be further configured to detect the first portable device 106B carried by the first user 114 based on the first sensor data of the first user 114. Typically, conventional gesture-based devices, which employ an image sensor or a camera, have a visual limitation, and thus cannot see a device or an object if it is hidden in clothes or beyond the field-of-view of the camera. However, as the cross-correlation system 102 uses the radio detection and ranging system 106A, which can scan human body, and generate 3D point cloud data, any object even if it is hidden within clothes may be detected. Thus, based on the first sensor data of the first user 114, the cross-correlation system 102 is able to find that the first portable device 106B (e.g. a smartphone) is carried by the first user 114. The first portable device 106B (e.g. the smartphone) may be communicatively coupled to the cross-correlation system 102, for example, to access the first type of communication network 108.

The cross-correlation system 102 may be further configured to obtain second sensor data from the first portable device 106B based on the detection of the first portable device 106B of the first user 114. In an example, the second sensor data may include a device identity, location information, and signal strength information of the first portable device 106B. The second sensor data may be received via at least one of: a wireless wide area network signal, a wireless local area network signal, a wireless personal area network signal, or a combination thereof. The location coordinates of the radio detection and ranging system 106A may be known as it is installed in a given physical area. Thus, when the second sensor data is obtained, which include the device identity, the location information, and the signal strength information of the first portable device 106B, location coordinates of the first portable device 106B (e.g. both angle and the distance of the first portable device 106B) may be ascertained. Since it is detected that the first portable device 106B is carried by the first user 114, the location coordinates of the user 114 may be ascertained.

The cross-correlation system 102 may be further configured to cross-correlate the first sensor data and the second sensor data to obtain cross-correlated information of the first user 114. From the cross-relation, an accurate identification of the user 114 may be made. Moreover, an accurate determination of the location of the first user 114 is also established. For example, the coordinates of the points of the 3D point cloud data may be merged with the location coordinates of the first portable device 106B, and any deviation if detected, is thus corrected.

In accordance with an embodiment, the cross-correlation system 102 may be further configured to utilize a trained deep neural network to cross-correlate the first sensor data and the second sensor data to obtain the cross-correlated information. In some embodiments, a deep neural network may be first trained for several users in order to learn cross-correlation of different sensor data. The deep neural network may be an artificial neural network with multiple layers between the input and output layer. In an example, the deep neural network selected for training may be a convolutional neural network. In an exemplary implementation, the structure (or architecture) selected may be any known structure of the convolutional neural network. For example, an input layer, an input sampling stage, for example to handle input from multiple sensors (e.g. one or more of the plurality of communication systems 106, a plurality of fully connected layers, and an output layer. In some cases, a softmax layer may also be added to the output layer. The training of the deep neural network (e.g. the selected convolutional neural network) is carried out to solve the user identification even if a user is moving (or a body shape changes). Sometimes, use of the first sensor data alone from the radio detection and ranging system 106A may be deceiving to identify a user, especially when a user is moving or bending (e.g. during a game play). Thus, having sensor data from multiple sensor devices, such as the second sensor data from the first portable device 106B or one or more of the plurality of user-devices 106D, . . . , 106N, increases the reliability of the user identification as well as enhances the tracking of each user. In the training phase, the training data used to train the deep neural network (e.g. the selected convolutional neural network) may be selected, for example, for at least 10-100 users depending on the defined threshold set for accuracy. The training algorithm used may be unsupervised or semi-supervised. In the training, the deep neural network (e.g. the selected convolutional neural network) may be initially fed with human shape and configuration data, for example, different shapes of the human body, different positions, movements, bending and standing states, and other game play positions to reduce training time. The results (including gradients and weights) of the deep neural network may be evaluated, and weights adjusted accordingly until an accuracy greater than a defined threshold (e.g. 95%, 99% or even 99.9999%) is achieved. In an example, the initial training before deployment may be a one-time activity. Once the trained deep neural network is obtained, such model may then be used from deployment in operational phase. At the time of deployment, a few 2D images (e.g. front and rear image) or even one image of the front of the human body and sensor data from the radio detection and ranging system 106A of a user is sufficient to detect any future movement and for future identification of the user. Registration of different movements, and different images and sensor data capturing change in body shapes, and configurations, may not be required, thereby improving the readiness of the trained deep neural network during deployment. However, it is to be understood to one of ordinary skill in the art that some auto-training and self-calibration may be executed even after deployment or updates may be provided remotely to the deployed trained deep neural network. In some embodiments, pre-registration of a user may not be required, and the cross-correlation system 102 may be configured to dynamically assign a new user identifier, each time a new user is detected. The user information for each new user may be stored in the cross-correlation information database 116.

The cross-correlation system 102 may be further configured to recognize a first gesture specific to the first user 114 based on the cross-correlated information of the first user 114. There may be tens to hundreds, or thousands of users associated with the cross-correlation system 102. Moreover, each user may have different preferences in terms of which and how many controllable devices a given user may want to control, the way the given user wants to control such controllable devices, and the actions the given user want to operate when such controllable devices are in control, and whether the control is a one-time control or a continuous control to perform different actions for a specific time period. Based on the cross-correlated information of the first user 114, the cross-correlation system 102 identifies the first user 114. Thereafter, when the first user 114 performs the first gesture, the cross-correlation system 102 quickly recognizes the first gesture. Alternatively stated, the cross-correlation system 102 may be further configured to identify the first user 114 based on the cross-correlated information of the first user 114. The cross-correlation system 102 may be further configured to determine a position (i.e. accurate location coordinates) of the first user 114 based on the cross-correlated information of the first user 114.

The cross-correlation system 102 may be further configured to identify the first controllable device 112A from the plurality of controllable devices 112 and a first action that is to be executed at the identified first controllable device 112A, based on the first gesture. Typically, in conventional systems, a single device is configured for gesture control with simple pre-configured gestures. However, still existing systems lack in performance in terms of accuracy of recognition, speed of recognition, and communication reliability. Moreover, existing gesture control technologies have special requirements to function properly. For example, a predefined distance and a dedicated empty space is usually required for user detection and the user subject identification. Multiple users may confuse the conventional systems. Additionally, latency is another technical problem with existing communication systems and network architecture and such latency increases when more wireless access points or relay nodes are introduced in the network to extend the communication range. In contradiction to existing systems, just based on one gesture (e.g. the first gesture), the cross-correlation system 102 is configured to identify the correct controllable device (i.e. the first controllable device 112A in this case) from hundreds of controllable devices (i.e. the plurality of controllable devices 112) and at the same time is also able to identify a specific action that is to be executed at the identified first controllable device 112A, based on the first gesture, thereby improving the performance.

In accordance with an embodiment, the cross-correlation system 102 may be further configured to split the first gesture into a first component and a second component. The first controllable device 112A is identified based on the first component, and the first action is identified based on the second component. Thus, when the first component is recognized, the second component may be changed in order to change the action or perform a new action while the first component is maintained to continuously control the first controllable device 112A.

In an implementation, the first gesture corresponds to a hand gesture. In such a case, the cross-correlation system 102 may be further configured to detect a first configuration of a first hand and a second configuration of a second hand of the first user 114. The cross-correlation system 102 may be further configured to determine a joint meaning of the first configuration of the first hand and the second configuration of the second hand specific to the first user 114 for recognition of the first gesture. The cross-correlation system 102 may be further configured to set the first configuration of the first hand as the first component of the first gesture and the second configuration of the second hand as the second component of the first gesture. The cross-correlation system 102 may be further configured to utilize or control the first component to control the first controllable device 112A from the plurality of controllable devices 112 and the second component to execute the first action associated with the identified first controllable device 112A. In another implementation, the first gesture corresponds to a single hand gesture, where a defined number of fingers and their configuration may be used as the first component (e.g. for controllable device identification purpose), and remaining fingers and their configuration may be used to recognize the second component (e.g. for recognition of the action that is to be performed in relation to the first component). Alternatively, two different time slots may be assigned to recognize the first gesture. A first time slot (e.g. 5 seconds) may be used to recognize the first component and the next time slot may be used to recognize the second component.

In an implementation, the cross-correlation system 102 may be further configured to track a relative movement of the second hand in the second configuration with respect to the first hand in the first configuration. Different relative movement of the second hand along with a specific configuration may be assigned a different meaning in terms of actions to be executed. Thus, when the relative movement of the second hand in the second configuration is tracked, the meaning of the relative movement in terms of action to be executed is determined. In another implementation, the cross-correlation system 102 may be further configured to track a change in the second configuration of the second hand while the first configuration is maintained. For example, while the first configuration is maintained, it may indicate that the first controllable device 112A is still under control of the cross-correlation system 102, whereas the change in the second configuration of the second hand indicates a change in action that needs to be executed at the identified first controllable device 112A. In yet another implementation, the cross-correlation system 102 may be further configured to track an independent movement of the second hand in the second configuration while the first configuration of the first hand is maintained. In this case, instead of tracking the relative movement of the second hand to understand the meaning of the movement, the movement of the second hand in the second configuration is tracked independently. The cross-correlation system 102 may be further configured to control the identified first controllable device 112A to execute a sequence of actions for a specified time period based on a continuous tracking of the relative movement of the second hand, the change in second configuration, the independent movement of the second hand, or a combination thereof.

In accordance with an embodiment, alternatively, the first gesture corresponds to a combination of a voice command and a movement of a set of points in the first sensor data of the first user 114. The movement of the set of points in the first sensor data refers to a movement of a body part, for example, head, hands, arms, legs, torso, or a combination thereof. In an example, the voice command may be set as the first component used to identify a specific controllable device (such as the first controllable device 112A or the second controllable device 112B) and the movement of the set of points in the first sensor data of the first user 114 may be set as the second component to identify an action (e.g. the first action) to be executed on the identified controllable device.

In accordance with an embodiment, the cross-correlation system 102 may be further configured to obtain an image of the first user 114 from the image-capture device 106C. The cross-correlation system 102 may be further configured to obtain third sensor data from the plurality of user-devices 106D, . . . , 106N associated with the first user 114. The plurality of user-devices 106D, . . . , 106N may be wearable devices or other personal user devices of the first user 114. The cross-correlation system 102 may be further configured to cross-correlate the image and the third sensor data with the first sensor data and the second sensor data to obtain additional cross-correlated information of the first user 114.

In accordance with an embodiment, the cross-correlation system 102 may be further configured to modulate control instructions associated with the first controllable device 112A, in a mmWave radio frequency signal of a specified frequency. In an implementation, the specified frequency of the mmWave radio frequency signal is in a range of 55 gigahertz (GHz) to 65 GHz, preferably about 60 GHz. The cross-correlation system 102 may be further configured to distribute the mmWave radio frequency signal that carries the control instructions to the plurality of cascaded repeater devices 104A to 104N.

The plurality of radio frequency signals corresponding to different communication protocols are obtained from the plurality of communication systems 106 by the cross-correlation system 102. Each of the plurality of radio frequency signals communicated over a corresponding type of network of the plurality of different type of networks 110 has a defined communication range. A coverage of the plurality of radio frequency signals corresponding to different communication protocols is extended beyond the defined communication range based on a distribution of the mmWave radio frequency signal of a specified frequency that includes the plurality of radio frequency signals and the control instructions modulated in the mmWave radio frequency signal. In an example, firstly, the cross-correlation system 102 may be further configured to generate mmWave radio frequency signal of the specified frequency. Thereafter, the cross-correlation system 102 may be further configured to map and align the plurality of radio frequency signals corresponding to different communication protocols in the mmWave radio frequency signal (e.g. the generated mmWave waveform) in accordance to a number of source antennas from which the plurality of radio frequency signals are obtained. The plurality of radio frequency signals may be aligned with different spacing. In an example, the plurality of radio frequency signals may be placed next to each other in the frequency domain, minimizing the frequency gaps between different waveforms in the frequency domain. In another example, the plurality of signals are placed with some gap or guard interval in between the signals to ease the selection filtering needed to select and disaggregate these radio frequency waveforms. In another example, as a large amount of spectrum is available over the mmWave radio frequency signal of the specified frequency, the plurality of radio frequency signals may be placed with suitable large gaps in between. This spaced alignment of each radio frequency signal in the mmWave radio frequency signal may be greater than a defined threshold and may be utilized for purpose of minimizing sensitivity and degradation due to other interfering signals operating in the same frequency bands. For example, in a conventional scenario, assuming, there are four radio frequency waveforms from systems S1, S2, S3, S4, where each radio frequency waveform may occupy 400 MHz spectrum. If all four streams (RF waveforms or signals) are packed and aligned next to each other in frequency domain, a bandwidth of about 1.6 GHz will be occupied. In such conventional scenario, if a wideband interfering signal is encountered, all four streams (i.e. all four radio frequency waveforms) may be impacted (and overlapped) at same time, and hence may likely disrupt communication link. In some embodiments of the present disclosure, the four radio frequency waveforms if placed in frequency domain with about 1 GHz gap in between adjacent streams (RF waveforms). In this case, presence or appearance of a wideband interfering signal would only overlap/impact one out of four streams (i.e. one of the four radio frequency waveforms). Given the MIMO and channel coding applied on the four streams (i.e. the four radio frequency waveform), there is a higher probability the original information stream can be recovered at receiver side (e.g. end-user devices), given the redundancy in the correction capability embedded into the streams being transmitted over the air.

The cross-correlation system 102 may be further configured to merge the obtained plurality of radio frequency signals corresponding to different communication protocols and the control instructions into the mmWave radio frequency signal of the specified frequency. In an example, the plurality of radio frequency signals and the control instructions are upconverted at different frequency and are multiplexed by frequency division multiplexing. In another example, the plurality of radio frequency signals including the control instructions at different frequency are multiplexed in a time-division multiplexing. In an example, data received over the plurality of radio frequency signals may be converted in the form of bits, before transmission of such bits over a wired medium or a wireless medium by manipulation of frequency and one or more other signal characteristic, such as amplitude, and/or phase, of the mmWave radio frequency signal. In an example, higher order modulation schemes, such as 16QAM, 64QAM, may be used to allow more information to be packed into a single mmWave signal, which improves spectral efficiency of wireless communication.

The cross-correlation system 102 may be further configured to transmit, through a wired or a wireless medium the mmWave radio frequency signal of the specified frequency to the first repeater device 104A that further transfers the mmWave radio frequency signal to at least one repeater device, such as the second repeater device 104B via a second wired or a wireless medium. In an implementation, the cross-correlation system 102 may be further configured to provide the mmWave radio frequency signal of the specified frequency to the plurality of cascaded repeater devices 104A to 104N that are arranged at a plurality of different locations and are communicatively coupled in a cascaded structure over wired mediums or wireless mediums in a chain transmission. In another implementation, the cross-correlation system 102 may be further configured to provide the mmWave radio frequency signal of the specified frequency to the plurality of cascaded repeater devices 104A to 104N in a parallel transmission. At least one repeater device of the plurality of cascaded repeater devices 104A to 104N is configured to extract the control instructions, from the mmWave radio frequency signal, and provide the control instructions to the first controllable device 112A that is communicatively coupled to the at least one repeater device (such as the first repeater device 104A in this case).

The cross-correlation system 102 may be further configured to control the identified first controllable device 112A to execute the first action based on the first gesture. In an example, the first controllable device 112A may be an audio system that is identified based on the first gesture. Moreover, based on the first gesture, it may be further identified that the first user 114 wants to change the song currently played at the audio system. Thus, based on the first gesture, the cross-correlation system 102 may continuously control the audio system for a specific time period and execute one or more actions at the audio system based on the recognized first gesture. In another example, the first controllable device 112A may be a robot system that is identified based on the first gesture. Moreover, based on the first gesture, it may be further identified that the first user 114 wants to instruct the robot system to come to the first user 114 from its existing location. As the location coordinate of the first user 114 is ascertained based on the cross-correlation information, such information may be shared by the cross-correlation system 102 to the robot system when the first gesture is recognized. In other words, in order to execute the first action based on the first gesture, the cross-correlation system 102 is configured to determine supplementary information required to execute the first action, and provide the determined supplementary information to the identified controllable device, such as the robot system.

In an exemplary implementation, the cross-correlation system 102 may be a source node, that is "Node A", which may be configured and designed to operate at frequency f1 (e.g. 60 GHz) while the plurality of controllable devices 112 which may be also referred to as target destination nodes (e.g. referred to as Node B and Node B') are configured and designed to operate at propagation frequency f2 (5 GHz or sub-6 GHz). The conversion between these two frequencies f1 and f2 is then performed by the plurality of cascaded repeater devices 104A to 104N placed in between the cross-correlation system 102 (i.e. the Node A) and the Node B/B' for closing communication link. For example, communication links between the cross-correlation system 102 (i.e. the Node A) and the repeaters, such as the first repeater device 104A and the second repeater device 104B) may be established over frequency f1 and with available bandwidth and required propagation properties, whereas the communication link between the last repeater unit in the chain (such as the Nth repeater device 104N) and the target destination nodes (i.e. Node B/B') may be established over frequency f2 and over a wireless radio frequency propagation environment (e.g. Wi-Fi bands in 5 GHz, or CBRS band).

In accordance with an embodiment, the cross-correlation system 102 may be further configured to exchange a plurality of data streams with the plurality of controllable devices 112 (or other end-user devices or the one or more communication systems of the plurality of communication systems 106) over the plurality of radio frequency signals via one or more repeater devices, such as the first repeater device 104A and the second repeater device 104B. In an example, the first repeater device 104A and the second repeater device 104B may be at a distance from the cross-correlation system 102 (and the plurality of communication systems 106) that is beyond the usual communication range (e.g. usual range of 2.4 GHz Wi-Fi is approximately 40 to 50 meters indoors and 92 to 100 meters outdoors). The provisioning of the Wi-Fi signals and the Bluetooth signals in the form of the mmWave radio frequency signal to the first repeater device 304A and the second repeater device 304B over wired or wireless mediums improves the transmission speed and data rate, reduces latency and at the same time enables each individual controllable device, such as the first controllable device 112A to quickly and wirelessly access its control instructions (as well as data stream, if any) in almost near zero latency over the extracted Wi-Fi signals from the mmWave radio frequency signal via the first repeater device 104A. Similarly, in an example, controllable devices having Bluetooth-only capability may connect to the first repeater device 104A (or the second repeater device 104B) to access its data or control instructions (meant for only the designated device) over the Bluetooth signal distributed by the first repeater device 104A (or the second repeater device 104B). Thus, a high-performance, near zero latency, and noise-free content (e.g. data, audio, and video including 4K or 8K video) communication is achieved for an always connected experience in significantly improved data rates as compared to conventional Wi-Fi, Bluetooth, Zig-bee, or "WiGig" communication systems.

Figure 2A:
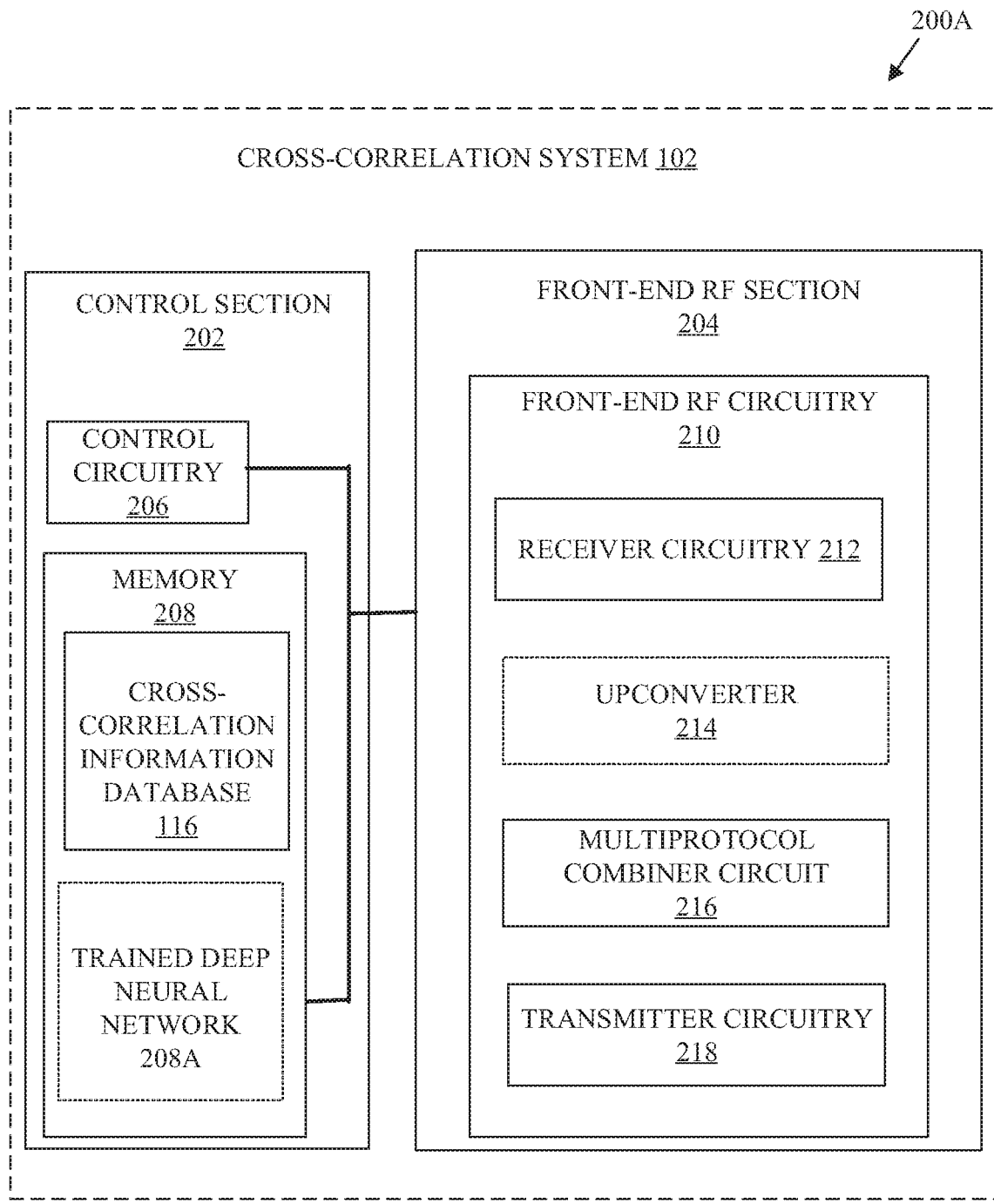
FIG. 2A is a block diagram that illustrates various components of an exemplary cross-correlation system, in accordance with an exemplary embodiment of the disclosure.

FIG. 2A is a block diagram that illustrates various components of an exemplary cross-correlation system, in accordance with an exemplary embodiment of the disclosure. FIG. 2A is explained in conjunction with elements from FIG. 1. With reference to FIG. 2A, there is shown a block diagram 200A of the cross-correlation system 102. The cross-correlation system 102 may include a control section 202 and a front-end radio frequency section 204. The control section 202 may include a control circuitry 206 and a memory 208. The memory 208 may include the cross-correlation information database 116 and a trained deep neural network 208A. The control section 202 may be communicatively coupled to the front-end radio frequency section 204. The front-end radio frequency section 204 may include a front-end radio frequency circuitry 210. The front-end radio frequency circuitry 210 may further include a receiver circuitry 212, an upconverter 214, a multiprotocol combiner circuit 216, and a transmitter circuitry 218.

The control circuitry 206 include suitable logic and interfaces configured to control the front-end radio frequency circuitry 210. The cross-correlation system 102 may be a programmable device, where the control circuitry 206 may execute instructions stored in the memory 208. Example of the implementation of the control circuitry 206 may include, but are not limited to, an embedded processor, a microcontroller, a digital signal processor, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the DSP 206. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The memory 208 may be configured to store the cross-correlation information database 116 and the trained deep neural network 208A. The trained deep neural network 208A may be configured to cross-correlate the first sensor data and the second sensor data to obtain the cross-correlated information. In an example, the trained deep neural network 208A may operate under the control of the control circuitry 206 of the cross-correlation system 102. In some embodiments, the control circuitry 206 may be configured to provide input to the trained deep neural network 208A and acquire output. The trained deep neural network 208A may be a convolutional neural network trained using semi-supervised or unsupervised learning. In the training phase, the deep neural network may be initially fed with human shape and configuration data, for example, different shapes of human body, different positions, movements, bending and standing states, and other game play positions to reduce training time. At the time of deployment, one or two images (e.g. front and rear image) or even one image of the front of the human body and sensor data from the radio detection and ranging system 106A of a given user is sufficient to accurately detect any future movement and for future identification of the given user. Registration of different movements, and different images and sensor data capturing change in body shapes, and configurations, may not be required, thereby improving the readiness of the trained deep neural network 208A during deployment. In some embodiments, alternatively, the control circuitry 206 of the cross-correlation system 102 may not use the trained deep neural network 208A, and various operations of the cross-correlation system 102, described, for example, in FIG. 1 may be performed by the control circuitry 206 independent of the trained deep neural network 208A. For example, the cross-correlation of the first sensor data and the second sensor data to obtain cross-correlated information of the first user 114; the recognition of the first gesture specific to the first user 114 based on the cross-correlated information of the first user 114; identification of the first controllable device 112A from the plurality of controllable devices 112 and the first action that is to be executed at the identified first controllable device 112A; and control of the identified first controllable device to execute the first action based on the first gesture, and the like, may be performed by the control circuitry 206. The exemplary functions of the control circuitry 206 is further described, for example, in FIG. 3A to 3C.

The front-end radio frequency circuitry 210 may include the receiver circuitry 212, the upconverter 214, the multi-protocol combiner circuit 216, and the transmitter circuitry 218. The receiver circuitry 212 may be configured to receive (or obtain) a plurality of radio frequency signals corresponding to different communication protocols via the plurality of different type of networks 110. For example, the receiver circuitry 212 may be configured to receive Wi-Fi signals, for example, in 2.4 GHz to 5 GHz, Bluetooth signals, Zigbee signals, infrared signals, or other types of radio frequency signals, such as wireless wide area network signals over one or more frequencies, wireless local area network signals, or wireless personal area network signals, or a combination thereof, from the plurality of communication systems 106. In an example, the receiver circuitry 212 may include a cascading receiver chain comprising various components (e.g., an antenna array, a set of low noise amplifiers (LNA), a set of receiver front end phase shifters, and a set of power combiners) for the signal reception (not shown for brevity). Some of the communication systems of the plurality of communication systems 106 may be connected with the cross-correlation system 102 via a wired medium, such as a coaxial cable, a fiber optic cable and the like, to receive input from the one or more of the plurality of communication systems 106 and provide output to at least one repeater device (such as the first repeater device 104A) of the plurality of cascaded repeater devices 104A to 104N.

The upconverter 214 may be configured to upconvert a frequency of each of the plurality of radio frequency signals to a different frequency. In some embodiments, the upconverter 214 may be a phased locked loop (PLL) circuit may be provided in the cross-correlation system 102, which acts a local oscillator and may be associated with the transmitter circuitry 218 to facilitate up conversion of each input radio frequency signals to a different frequency before transmission.

The multiprotocol combiner circuit 216 may be configured to merge the obtained plurality of radio frequency signals corresponding to different communication protocols and the control instructions into a mmWave radio frequency signal of a specified frequency, and transmit, over a wired or a wireless medium, to the first repeater device 104A. Alternatively, the multiprotocol combiner circuit 216 may be configured to merge the obtained plurality of radio frequency signals corresponding to different communication protocols and the control instructions into a first radio frequency signal (a multiplexed signal but not mmWave radio frequency signal) having a frequency less than the mmWave radio frequency signal. In such as case, the up conversion of the first radio frequency signal may be executed at the first repeater device 104A. In an implementation, the multiprotocol combiner circuit 216 may be configured to merge the obtained plurality of radio frequency signals corresponding to different communication protocols under the control of the control circuitry 206 (e.g. when an instruction to merge is communicated by the control circuitry 206 to the multiprotocol combiner circuit 216, via a system bus (not shown). The obtained plurality of radio frequency signals corresponding to different communication protocols and the control instructions to control identified controllable device (e.g. the first controllable device 112A) may be multiplexed (Mux) into the mmWave radio frequency signal of the specified frequency (e.g. 60 GHz). In some embodiments, the multiprotocol combiner circuit 216 may be further configured to insert one pilot tone of a defined frequency into the mmWave radio frequency signal of the specified frequency. The defined frequency may be distinct and different from any other upconverted frequency of the plurality of radio frequency signals or the specified frequency.

The transmitter circuitry 218 may be configured to transmit the mmWave radio frequency signal of the specified frequency, over a wired medium or a wireless medium, to the first repeater device 104A. In an implementation, the transmitter circuitry 218 may be configured to transmit the mmWave radio frequency signal under the control of the control circuitry 206 (e.g. when an instruction to transmit is communicated by the control circuitry 206 to the transmitter circuitry 218. In an example, transmitter circuitry 218 may include a cascading transmitter chain comprising various components for baseband signal processing or digital signal processing. In an example, the mmWave radio frequency signal in the specified frequency may be distributed to other repeater devices of the plurality of cascaded repeater devices 104A to 104N to form a mmWave mesh network over wired or wireless mediums. In accordance with an embodiment, the front-end radio frequency circuitry 210 may receive input radio frequency signals and transmit the one or more mmWave radio frequency signals in accordance with multiple-input multiple-output (MIMO) reception and transmission with the plurality of communication systems 106, whereas may communicate with one or more repeater devices over wired mediums.

In accordance with an embodiment, the first portable device 106B and the user-device 106D may be moved to a second physical area (e.g. a second room) at a second location from the first physical area (e.g. a first room) at first location. In an example, the second physical area may be more than 700 meters from the first physical area. Alternatively stated, the second physical area may be beyond the usual communication range of a first network (e.g. beyond 100 meters) associated with a first protocol (e.g. the Bluetooth protocol) and a second network (beyond 150 feet) associated with the second protocol (e.g. Wi-Fi protocol) from the cross-correlation system 102. In such a case, the first portable device 106B may continue to receive a first content item (i.e. the data item) uninterruptedly from the first repeater device 104A at the second physical area (i.e. the second room) at the second location. Similarly, the user-device 106D may continue to receive the second content item (i.e. a 4K video) uninterruptedly from the first repeater device 104A at the second physical area (i.e. the second room) at the second location. In other words, both the first portable device 106B and the user-device 106D may be communicatively coupled over different wireless network (i.e. the Bluetooth and the Wi-Fi network in this case) with the same device, such as the first repeater device 104A, via which MIMO communication is established to continue receiving respective content items, such as the first content item and the second content item, from the cross-correlation system 102. Based on the mmWave radio frequency signal of the specified frequency received, over a wired or a wireless medium, from the cross-correlation system 102, the first repeater device 104A distributes the first content item to the first portable device 106B wirelessly over a Bluetooth signal (i.e. the Bluetooth protocol). Similarly, based on the mmWave radio frequency signal of the specified frequency received from the cross-correlation system 102, the first repeater device 104A is able to distribute the second content item to the user-device 106D via a Wi-Fi signal within the second physical area (i.e. the second room) at the second location when the first portable device 106B and the user-device 106D are moved to the second physical area (i.e. the second room). The first content item may be carried over a first radio frequency signal of the plurality of radio frequency signals present in the mmWave radio frequency signal. Similarly, the second content item may be carried over a second radio frequency signal of the plurality of radio frequency signals present in the mmWave radio frequency signal. Thus, the two different radio frequency signals of the plurality of radio frequency signals that carries the first content item and the second content item may be retrieved at the first repeater device 104A based on the mmWave radio frequency signal of the specified frequency (e.g. 60 GHz) received from the cross-correlation system 102. Moreover, at the same time the control instructions extracted from mmWave radio frequency signal may be provided to the identified first controllable device 112A with almost zero or negligible latency to enable execution of the first action or other actions in response to the gesture recognized by the cross-correlation system 102. Thus, the disclosed cross-correlation system 102 provides a noise-free and an always-connected experience as a result of its multiprotocol feature. The multiprotocol feature provides a capability to the cross-correlation system 102 and the cascaded repeater devices connected over wired or wireless mediums with each other (such as the first repeater device 104A) to handle different wireless communication protocols and control instructions concurrently in terms of extending their range as well as increasing bandwidth concurrently while reducing latency to near zero in the cross-correlation system 102 for high performance content communication, spatial detection, and gesture-based device control using a combination of wired and wireless medium, the multiprotocol feature, and using both mmWave radio frequency signal and sub 6 GHz frequencies for communication.

Figure 2B:
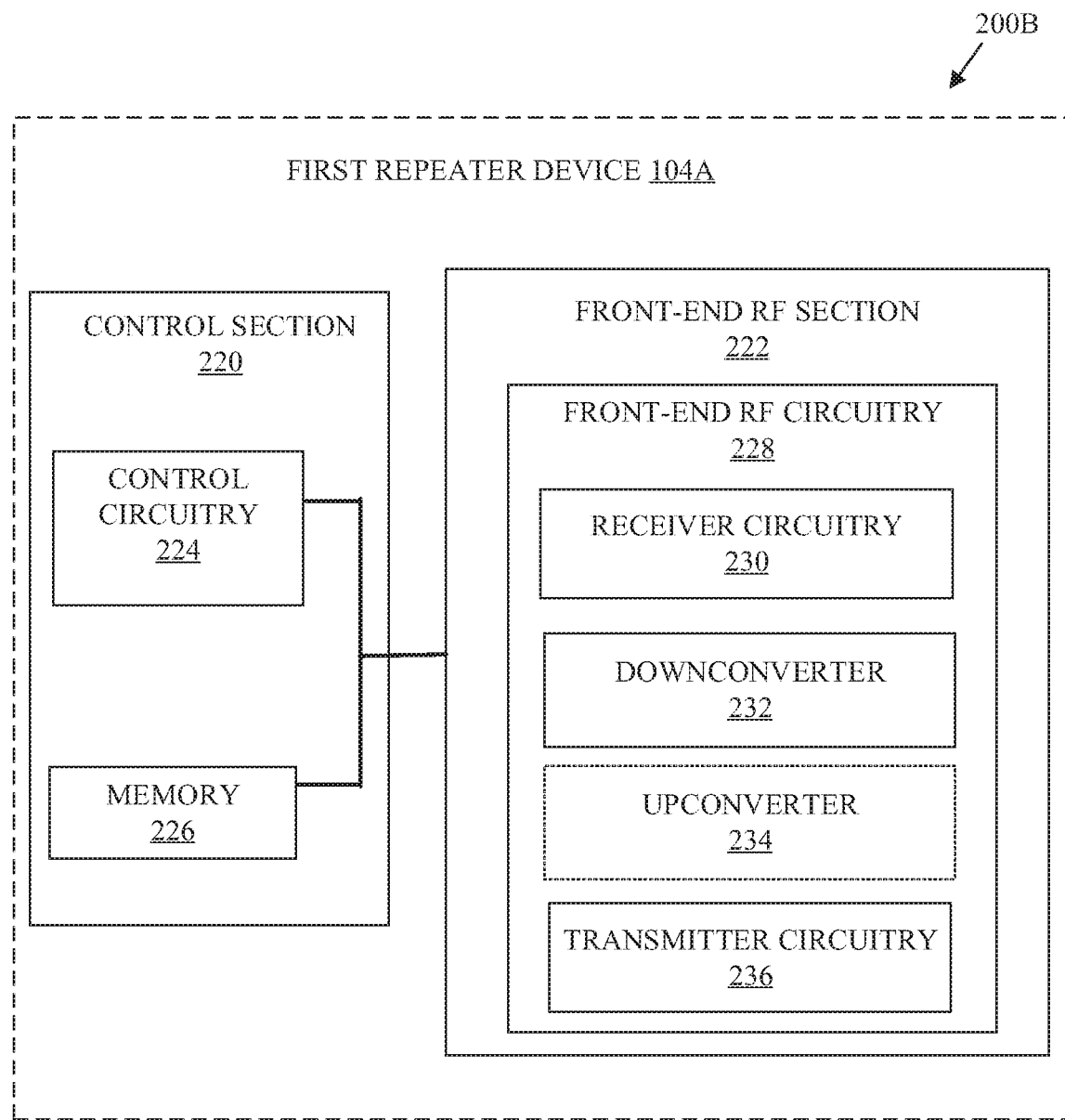
FIG. 2B is a block diagram that illustrates various components of an exemplary repeater device, in accordance with an exemplary embodiment of the disclosure.

FIG. 2B is a block diagram illustrating various components of an exemplary repeater device of an edge communication system, in accordance with an exemplary embodiment of the disclosure. FIG. 2B is explained in conjunction with elements from FIG. 1 and FIG. 2A. With reference to FIG. 2B, there is shown a block diagram 200B of the first repeater device 104A. The first repeater device 104A may include a control section 220 and a front-end radio frequency section 222. The control section 220 may include control circuitry 224 and a memory 226. The control section 220 may be communicatively coupled to the front-end radio frequency section 222. The front-end radio frequency section 222 may include front-end radio frequency circuitry 228. The front-end radio frequency circuitry 228 may further include a receiver circuitry 230, a downconverter 232, an upconverter 234, and a transmitter circuitry 236.

The control circuitry 224 may be configured to extract control instructions and one or more radio frequency signals from the plurality of radio frequency signals corresponding to different communication protocols from the mmWave radio frequency signal received over wired or wireless medium without performing any demodulation or digital signal processing to minimize latency.

The memory 226 may be configured store values of relative gain equalization that may be applied at the first repeater device 104A, before aggregating the radio frequency signals from end-user devices or controllable devices, such as the first controllable device 112A, and sending them up upstream towards the cross-correlation system 102 (or another repeater device which then transmits to the cross-correlation system 102). In some embodiments, the relative gain values may be received from the cross-correlation system 102. This enables the baseband processing units (MIMO pre-coding, decoding) to take in account such gain adjustment (which is not part of actual channel propagation between the first repeater device 104A and an end-user device in their MIMO processing. Examples of the implementation of the memory 226 may be same as that of the memory 208.

The front-end radio frequency circuitry 228 includes the receiver circuitry 230, the downconverter 232, the upconverter 234, and the transmitter circuitry 236. The front-end radio frequency circuitry 228 supports multiple-input multiple-output (MIMO) operations, and may be configured to execute MIMO communication with a plurality of end-user devices, and controllable devices, such as the first controllable device 112A, or the one or more communication systems of the plurality of communication systems 106. The MIMO communication is executed at a sub 6 gigahertz (GHz) frequency that is less than the specified frequency of the mmWave radio frequency signal. The mmWave radio frequency signal is received at specified frequency (e.g. 60 GHz), whereas the MIMO communication is executed at a different frequency, such as sub 6 gigahertz, with the plurality of end-user devices, the controllable devices, or the one or more communication systems of the plurality of communication systems 106. This mode of operation is beneficial and advantageous, given that the propagation at lower frequency (sub 6 GHz) results in rich scattering channel response, which leads to better MIMO capacity and MIMO performance. The downconverter 232 may be configured to down-convert one or more extracted radio frequency signal to a source frequency that is same as the frequency of a corresponding radio frequency signal of the plurality of radio frequency signals obtained from the plurality of communication systems 106. Similarly, the downconverter 232 may be configured to down-convert all the plurality of radio frequency signal to its original source frequency (e.g. 5 GHz, 2.5 GHz and the like). In some embodiments, the upconverter 234 may be configured to upconvert the radio frequency signals received from the end-user devices or controllable devices (such as the first controllable device 112A) for further distribution to the cross-correlation system 102 or relay to other repeater devices, such as the second repeater device 104B.

The transmitter circuitry 236 may be configured to further forward the received mmWave radio frequency signal of the specified frequency, over a wired or wireless medium, to the second repeater device 104B. The transmitter circuitry 236 may be configured to communicate with the plurality of end-user devices, and controllable devices, such as the first controllable device 112A. In an implementation, the transmitter circuitry 236 may be configured to transmit the mmWave radio frequency signal of the specified frequency under the control of the control circuitry 224. Examples of implementation of the transmitter circuitry 236 may be similar to that of the transmitter circuitry 218 of FIG. 2A.

In operation, the control circuitry 224 of the first repeater device 104A may be configured to extract control instructions and one or more radio frequency signals from the plurality of radio frequency signals corresponding to different communication protocols from the mmWave radio frequency signal received over wired or wireless medium without performing any demodulation or digital signal processing to minimize latency. The control circuitry 224 may be further configured to down-convert the extracted one or more radio frequency signals to a source frequency (i.e. original frequency) that is same as the frequency of a corresponding radio frequency signal of the plurality of radio frequency signals obtained from the plurality of communication systems 106. For example, the first repeater device 104A may be configured to down-convert the one or more extracted radio frequency signals to a source frequency (i.e. original frequency of 5 GHz or 2.5 GHz) that is same as the frequency of a corresponding radio frequency signal of the plurality of radio frequency signals obtained from the plurality of communication systems 106. Thereafter, the control circuitry 224 may be further configured to distribute, from the obtained mmWave radio frequency signal, the plurality of radio frequency signals corresponding to different communication protocols and the control instructions wirelessly to corresponding controllable devices, such as the first controllable device 112A, which are communicatively coupled to the first repeater device 104A. The first repeater device 104A may be further configured to distribute the plurality of radio frequency signals wirelessly the one or more communication systems of the plurality of communication systems 106 when such communication systems moves from the first location towards the second location and are within the communication range of the first repeater device 104A.

Similar to the first repeater device 104A, each repeater device of the plurality of cascaded repeater devices 104A to 104N is configured to extract, from the mmWave radio frequency signal, at least one of the merged plurality of radio frequency signals for consumption, thereby increase coverage of the plurality of radio frequency signals for an always-connected experience. For example, a user operating an end-user device 106D may communicate with the cross-correlation system 102 or the first repeater device 104A to receive a data item over a Bluetooth network from the cross-correlation system 102 (or the first repeater device 104A) in a first room. The user carrying the end-user device 106D may move to another room and may get connected with the second repeater device 104B. However, the end-user device may continue to receive the data item from the second repeater device 104B (e.g. based on extraction of the original Bluetooth signal by the second repeater device 104B).

In some embodiments, multi-stream gain adjustment or equalization may be applied to the plurality of radio frequency signals extracted from the mmWave radio frequency signal throughout a chain of repeaters (i.e. the plurality of cascaded repeater devices 104A to 104N). This relative gain adjustment may be applied in one (e.g. the first repeater device 104A or the plurality of cascaded repeater devices 104A to 104N). Such gain adjustments may be applied on the incoming radio frequency waveforms/signals or outgoing waveforms/signals. In an example, the relative gain adjustment/equalization may be applied for different purposes and/or due to different conditions, for example, to compensate for gain imbalances throughout the chain. For example, streams/radio frequency signals received by different antennas of first repeater device 104A (e.g. a repeater device) from one or more of the plurality of end-user devices or controllable devices (such as the first controllable device 112A) during uplink to the cross-correlation system 102 (Node B towards Node A), may have very different relative signals levels. Aggregating these received signals next to each other in the frequency domain, may degrade the signal quality of weaker signals, due to leakage of out-of-band emissions of comparatively stronger signals. To address this issue, some relative gain equalization may be applied at the first repeater device 104A, before aggregating the radio frequency signals from the end-user devices or controllable devices and sending them up upstream towards the cross-correlation system 102 (or another repeater device which then transmits to the cross-correlation system 102). In some embodiments, the relative gain values may be coordinated, or shared with, or may be set by Node A (i.e. the cross-correlation system 102). This is to enable the baseband processing (MIMO pre-coding, decoding) to take in account such gain adjustment (which is not part of actual channel propagation between the first repeater device 104A and an end-user device (or a controllable device) such as Node B) in their MIMO processing.

In some embodiments, the plurality of cascaded repeater devices 104A to 104N may not perform any digital processing, demodulation, or packet processing. All digital and baseband processing for communication to and from the plurality of end-user devices or controllable devices (e.g. standalone user equipment), such as the first controllable device 112A or the second controllable device 112B, are performed centrally at the cross-correlation system 102. The plurality of cascaded repeater devices 104A to 104N may not perform any waveform processing (e.g. demodulation), hence keeping the latency through the chain of the plurality of cascaded repeater devices 104A to 104N (e.g. repeater or relay devices) close to zero (e.g. orders of 10s of nanosecond). In other words, nearly zero latency is introduced to the plurality of radio frequency signals, allowing the cross-correlation system 102 and the plurality of controllable devices 112 (or other end-user devices) to mitigate very small latencies through the repeater chains (i.e. the plurality of cascaded repeater devices 104A to 104N) to execute corresponding action based on extracted control instructions. For example, the cross-correlation system 102 may be Node A, which may be a central unit (e.g. a central multi-protocol access point), and Nodes B/B' may be complete standalone controllable devices (e.g. the first controllable device 112A) communicatively coupled to the Node A directly, or to Wi-Fi-enabled devices (e.g. the plurality of cascaded repeater devices 104A to 104N) linked to multi-protocol access point Node A. All user/network management functions as well as digital processing of signals/streams may be performed by the Node A through its embedded digital unit (e.g. the control circuitry 206). The plurality of cascaded repeater devices 104A to 104N (e.g. repeater devices) may not perform demodulation/re-modulation of data streams. Although, the first repeater device 104A or the second repeater device 104B acts as an access point (or small cell) that provides access to end users Node B/B', and also provides coverage to end users (or the plurality of controllable devices 112) at a propagation frequency of sub 6 GHz that is less than the specified frequency of the mmWave radio frequency signal, all baseband/digital processing to support and maintain connections to the Nodes B/B' may be performed and managed by the Node A (i.e. the cross-correlation system 102).

In accordance with an embodiment, each of the plurality of cascaded repeater devices 104A to 104N may be further configured to execute multiple-input multiple-output (MIMO) communication with one or more controllable devices (of the plurality of controllable devices 112) that are wirelessly connected to corresponding repeater device. For example, the first repeater device 104A may be configured to execute MIMO communication with the first controllable device 112A and the second repeater devices 104B may be configured to execute MIMO communication with the second controllable device 112B. Each of the plurality of cascaded repeater devices 104A to 104N may be further configured to execute MIMO communication with one or more communication systems of the plurality of communication systems 106 when such communication systems are communicatively coupled to respective repeater devices. The MIMO communication may be executed at a sub 6 gigahertz (GHz) frequency that is less than the specified frequency of the mmWave radio frequency signal. The mmWave signal is received at a specified frequency (e.g. 60 GHz) over a wired medium (or a combination of wired and wireless medium) at respective repeater devices, such as the first repeater device 104A or the second repeater device 104B, whereas the MIMO communication is executed at a different frequency, such as sub 6 gigahertz, with the plurality of controllable devices 112 or the one or more communication systems of the plurality of communication systems 106. This mode of operation is beneficial and advantageous, given that the propagation at lower frequency (sub 6 GHz) results in a rich scattering channel response, which leads to better MIMO capacity and MIMO performance.

Figure 3A:
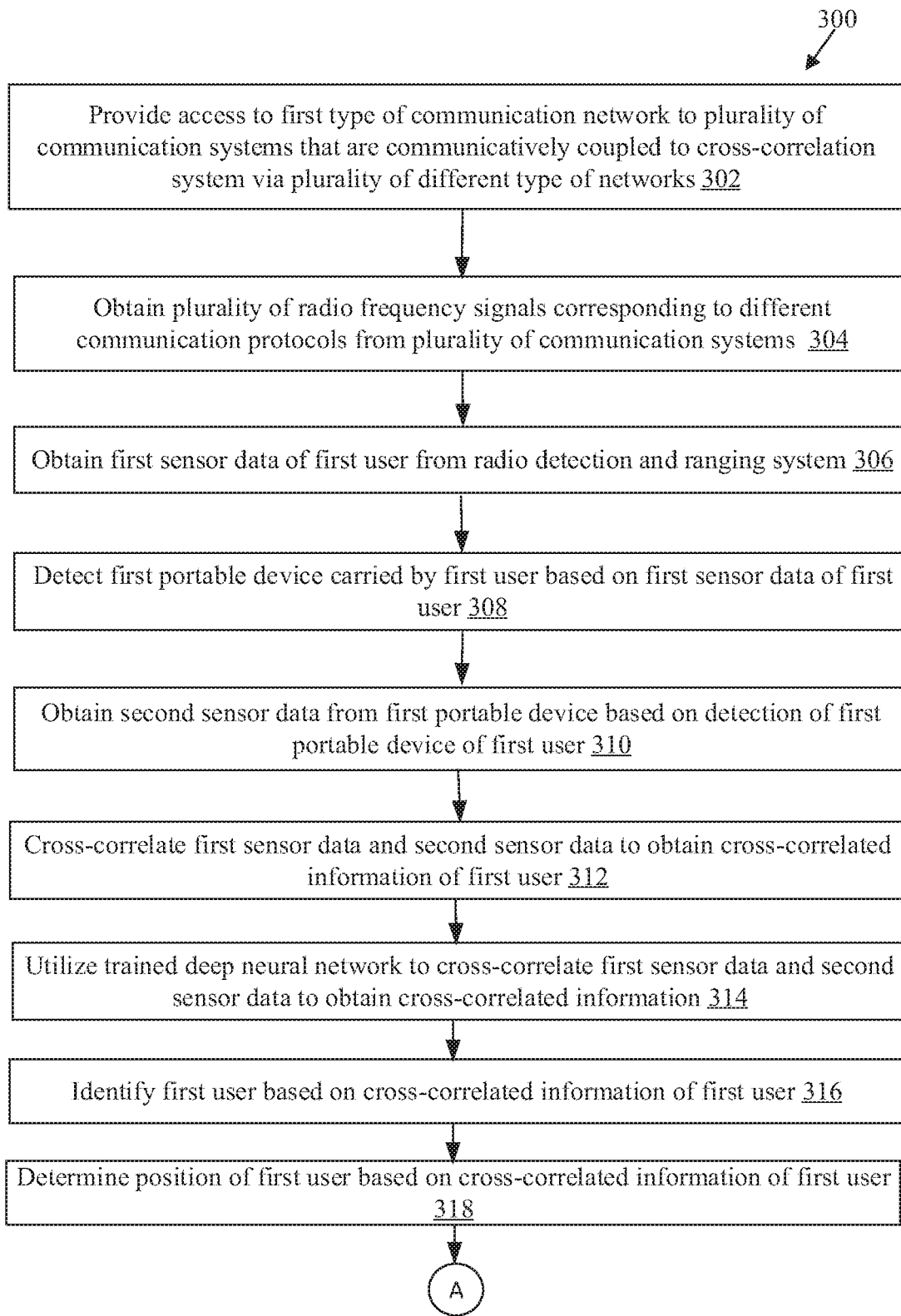
FIG. 3A, FIG. 3B, and FIG. 3C collectively, is a flowchart that illustrates an exemplary cross-correlation method for spatial detection using a network of RF repeaters, in accordance with an embodiment of the disclosure.
Figure 3B:
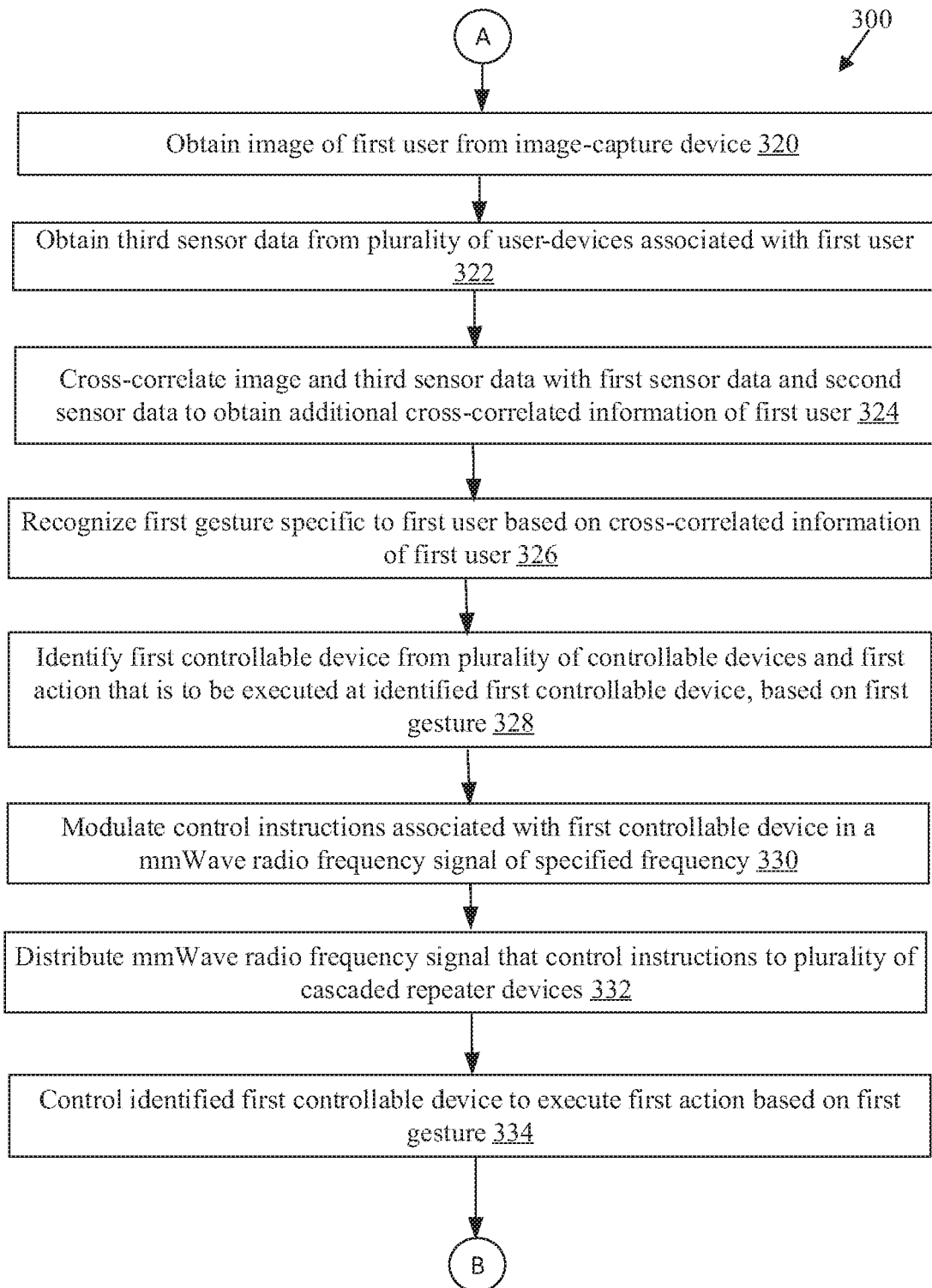
Figure 3C:
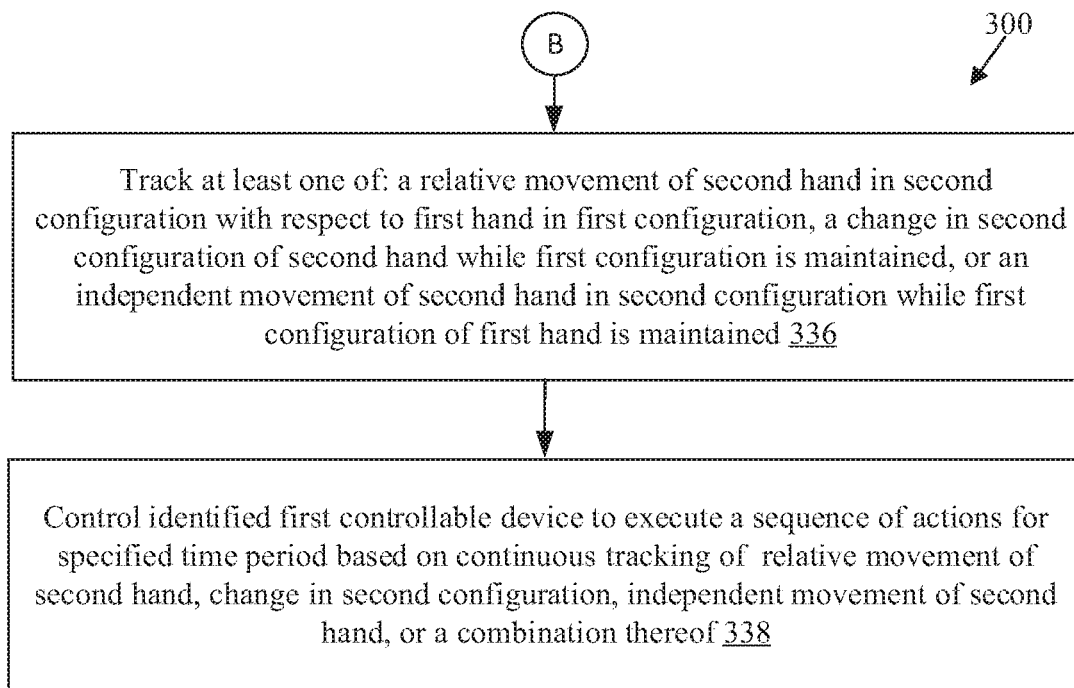

FIG. 3A, FIG. 3B, and FIG. 3C collectively, is a flowchart that illustrates an exemplary cross-correlation method for spatial detection using a network of RF repeaters, in accordance with an embodiment of the disclosure. FIGS. 3A, 3B, and 3C are explained in conjunction with elements from FIGS. 1, 2A, and 2B. With reference to FIGS. 3A, 3B, and 3C, there is shown a flowchart 300 comprising exemplary operations 302 through 338.

At 302, an access to the first type of communication network 108 may be provided by the cross-correlation system 102 to the plurality of communication systems 106 that are communicatively coupled to the cross-correlation system 102 via the plurality of different type of networks 110. The control circuitry 206 may be configured to provide the access to the first type of communication network to the plurality of communication systems 106.

At 304, a plurality of radio frequency signals corresponding to different communication protocols may be obtained by the cross-correlation system 102 from the plurality of communication systems 106. The receiver circuitry 212 may be configured to obtain the plurality of radio frequency signals corresponding to different communication protocols via the plurality of different type of networks 110 (e.g. via wired or wireless networks/mediums). The upconverter 214 may be configured to upconvert the frequency of each of the plurality of radio frequency signals to a different frequency.

At 306, first sensor data of the first user 114 may be obtained from the radio detection and ranging system 106A. The control circuitry 206 may be configured to obtain the first sensor data of the first user 114 from the radio detection and ranging system 106A, by use of the receiver circuitry 212.

At 308, the first portable device 106B carried by the first user 114 may be detected based on the first sensor data of the first user 114. The control circuitry 206 may be further configured to detect the first portable device 106B carried by the first user 114 based on the first sensor data of the first user 114.

At 310, second sensor data may be obtained from the first portable device 106B based on the detection of the first portable device 106B of the first user 114. The control circuitry 206 may be further configured to obtain the second sensor data from the first portable device 106B based on the detection of the first portable device 106B of the first user 114. The second sensor data may include a device identity, location information, and signal strength information of the first portable device 106B. The second sensor data may be received via at least one of: a wireless wide area network signal, a wireless local area network signal, a wireless personal area network signal, or a combination thereof.

At 312, the first sensor data and the second sensor data may be cross-correlated to obtain cross-correlated information of the first user 114. The control circuitry 206 may be further configured to cross-correlate the first sensor data and the second sensor data to obtain cross-correlated information of the first user 114.

At 314, a trained deep neural network (e.g. the trained deep neural network 208A) may be utilized to cross-correlate the first sensor data and the second sensor data to obtain the cross-correlated information. The control circuitry 206 may be further configured to utilize the trained deep neural network 208A to cross-correlate the first sensor data and the second sensor data to obtain the cross-correlated information that is then stored in the cross-correlated information database 116.

At 316, the first user 114 may be identified based on the cross-correlated information of the first user 114. The control circuitry 206 may be further configured to identify the first user 114 based on the cross-correlated information of the first user 114.

At 318, a position of the first user 114 may be determined based on the cross-correlated information of the first user 114. The control circuitry 206 may be further configured to determine the position (e.g. an accurate location coordinates) of the first user 114 based on the cross-correlated information of the first user 114.

At 320, an image of the first user 114 may be obtained from the image-capture device 106C. The control circuitry 206 may be further configured to obtain an image or a video of the first user 114 from the image-capture device 106C, by use of the receiver circuitry 212.

At 322, third sensor data may be obtained from the plurality of user-devices 106D, ..., 106N associated with the first user 114. The control circuitry 206 may be further configured to obtain the third sensor data (e.g. heath information or user activity information) may be obtained from the plurality of user-devices 106D, ..., 106N (e.g. wearable devices) associated with the first user 114.

At 324, the image and the third sensor data may be further cross-correlated with the first sensor data and the second sensor data to obtain additional cross-correlated information of the first user 114. The control circuitry 206 may be further configured to further cross-correlate the image and the third sensor data with the first sensor data and the second sensor data to obtain additional cross-correlated information of the first user 114. In an implementation, the control circuitry 206 may be further configured to utilize the trained deep neural network 208A to obtain the additional cross-correlated information of the first user 114.

At 326, a first gesture specific to the first user 114 may be recognized based on the cross-correlated information of the first user 114. The control circuitry 206 may be further configured to recognize the first gesture specific to the first user 114 based on the cross-correlated information of the first user 114. In an implementation, the first gesture may be a dual hand gesture. In such a case, the control circuitry 206 may be further configured to detect a first configuration of a first hand and a second configuration of a second hand of the first user 114. The control circuitry 206 may be further configured to determine a joint meaning of the first configuration of the first hand and the second configuration of the second hand specific to the first user 114 for recognition of the first gesture.

At 328, the first controllable device 112A may be identified from the plurality of controllable devices 112 and a first action that is to be executed at the identified first controllable device 112A, based on the first gesture. The control circuitry 206 may be further configured to identify the first controllable device 112A from the plurality of controllable devices 112 and a first action that is to be executed at the identified first controllable device 112A, based on the first gesture. In an implementation, the control circuitry 206 may be configured to split the first gesture into a first component and a second component. In such a case, the first controllable device 112A may be identified based on the first component, whereas the first action is identified based on the second component. In a case where the dual hand gesture is used, the control circuitry 206 may be configured to set the first configuration of the first hand as a first component of the first gesture and the second configuration of the second hand as a second component of the first gesture. Thereafter, the control circuitry 206 may be further configured to utilize or control the first component to control the first controllable device from the plurality of controllable devices 112 and the second component to execute the first action associated with the identified first controllable device 112A.

At 330, control instructions associated with the first controllable device 112A may be modulated in a mmWave radio frequency signal of a specified frequency. The multi-protocol combiner circuit 216 may be configured to modulate the control instructions associated with the first controllable device 112A in the mmWave radio frequency signal of the specified frequency, for example, 60 GHz. In accordance with an embodiment, the multiprotocol combiner circuit 216 may be configured to multiplex the obtained plurality of radio frequency signals corresponding to different communication protocols along with the control instructions into the mmWave radio frequency signal. The control circuitry 206 may be configured to map and align the plurality of radio frequency signals corresponding to different communication protocols and the control instructions in the mmWave radio frequency signal.

At 332, the mmWave radio frequency signal that carries the control instructions may be distributed to a plurality of cascaded repeater devices 104A to 104N. The transmitter circuitry 218 may be configured to distribute the mmWave radio frequency signal that carries the control instructions to the plurality of cascaded repeater devices 104A to 104N. The transmitter circuitry 218 may be configured to transmit the mmWave radio frequency signal of the specified frequency, over a wired medium or a wireless medium, to the first repeater device 104A, which then transmits to a next repeater device, such as the second repeater device 104B. In an implementation, the method further includes providing the mmWave radio frequency signal of the specified frequency, over different wired or wireless mediums, to the plurality of cascaded repeater devices 104A to 104N in a chain transmission or a parallel transmission. At least one of the merged plurality of radio frequency signals may be extracted and further distributed at each of the plurality of cascaded repeater devices 104A to 104N. Each of the plurality of radio frequency signals communicated over a corresponding type of wireless network of the plurality of different type of networks 110 has a defined communication range. The control circuitry 206 may be configured to extend a coverage of the plurality of radio frequency signals corresponding to the different communication protocols beyond the defined communication range based on the transmit of the mmWave radio frequency signal of the specified frequency that includes the plurality of radio frequency signals and the control instructions. At least one repeater device of the plurality of cascaded repeater devices is configured to extract the control instructions, from the mmWave radio frequency signal, and provide the control instructions to the first controllable device 112A that is communicatively coupled to the at least one repeater device (e.g. the first repeater device 104A). Moreover, the control circuitry 224 may be further configured to extract (or retrieve) one or more radio frequency signals corresponding to different communication protocols from the mmWave radio frequency signal. In an implementation, the cascaded repeater devices of the disclosed the cross-correlation system 102 receive mmWave radio frequency signal at a specified frequency f1 (e.g. 60 GHz) over a wired or wireless medium, and execute multiple input multiple output (MIMO) communication at sub 6 gigahertz (GHz) frequency (i.e. frequency f2) that is less than the frequency of the mmWave radio frequency signal, with one or more controllable devices. This mode of operation is beneficial and advantageous, given that the propagation at lower frequency (sub 6 GHz) results in rich scattering channel response, which leads to better MIMO capacity and MIMO performance, whereas receipt of mmWave radio frequency signal over wired (or a combination of wired and wireless) medium results in near zero latency and avoid unwanted effects, such as signal interference, of wireless-only mmWave signal propagation.

At 334, the identified first controllable device 112A may be controlled to execute the first action based on the first gesture. The control circuitry 206 may be further configured to control the identified first controllable device 112A, for example, based on the distributed mmWave radio frequency signal, to execute the first action based on the first gesture.

At 336, at least one of: a relative movement of the second hand in the second configuration may be tracked with respect to the first hand in the first configuration, a change in the second configuration of the second hand may be tracked while the first configuration is maintained, or an independent movement of the second hand in the second configuration may be tracked while the first configuration of the first hand is maintained. The control circuitry 206 may be further configured to track the relative movement of the second hand in the second configuration with respect to the first hand in the first configuration. Alternatively, the control circuitry 206 may be further configured to track the change in the second configuration of the second hand while the first configuration is maintained. Alternatively, the control circuitry 206 may be further configured to track the independent movement of the second hand in the second configuration while the first configuration of the first hand is maintained.

At 338, the identified first controllable device 112A may be controlled to execute a sequence of actions for a specified time period based on a continuous tracking of the relative movement of the second hand, the change in second configuration, the independent movement of the second hand, or a combination thereof. The control circuitry 206 may be further configured to control the identified first controllable device 112A to execute the sequence of actions for a specified time period based on a continuous tracking of the relative movement of the second hand, or the change in second configuration, or the independent movement of the second hand, or a combination thereof.

Various embodiments of the disclosure may provide a non-transitory computer-readable medium having stored thereon, computer implemented instructions that when executed by a computer causes a communication apparatus to execute operations, the operations comprising obtaining, by the control circuitry 206, first sensor data of the first user 114 from the radio detection and ranging system 106A. The operations may further comprise detecting, by the control circuitry 206, the first portable device 106B carried by the first user 114 based on the first sensor data of the first user 114; and obtaining, by the control circuitry 206, second sensor data from the first portable device 1068 based on detection of the first portable device 1068 of the first user 114. The operations may further comprise cross-correlating, by the control circuitry 206, the first sensor data and the second sensor data to obtain cross-correlated information of the first user 114, and recognizing, by the control circuitry 206, a first gesture, specific to the first user based on the cross-correlated information of the first user 114. The operations may further comprise identifying, by the control circuitry 206, the first controllable device 112A from the plurality of controllable devices 112 and a first action that is to be executed at the identified first controllable device 112A, based on the first gesture, and controlling, by the control circuitry 206, the identified first controllable device 112A to execute the first action based on the first gesture.

Various embodiments of the disclosure may provide the cross-correlation system 102 (FIG. 1). The cross-correlation system 102 includes control circuitry 206 (FIG. 2A) that is configured to obtain first sensor data of the first user 114 from the radio detection and ranging system 106A. The control circuitry 206 is further configured to detect the first portable device 106B carried by the first user 114 based on the first sensor data of the first user 114. The control circuitry 206 is further configured to obtain second sensor data from the first portable device 106B based on the detection of the first portable device 106B of the first user 114. The control circuitry 206 is further configured to cross-correlate the first sensor data and the second sensor data to obtain cross-correlated information of the first user 114. The control circuitry 206 is further configured to recognize a first gesture specific to the first user 114 based on the cross-correlated information of the first user 114. The control circuitry 206 is further configured to identify the first controllable device 112A from the plurality of controllable devices 112 and a first action that is to be executed at the identified first controllable device 112A, based on the first gesture. The control circuitry 206 is further configured to control the identified first controllable device 112A to execute the first action based on the first gesture.

In accordance with an embodiment, the control circuitry 206 is further configured to split the first gesture into a first component and a second component, and wherein the first controllable device is identified based on the first component, and the first action is identified based on the second component. In accordance with an embodiment, the first gesture corresponds to a hand gesture, wherein the control circuitry 206 is further configured to detect a first configuration of a first hand and a second configuration of a second hand of the first user 114. The control circuitry 206 is further configured to determine a joint meaning of the first configuration of the first hand and the second configuration of the second hand specific to the first user 114 for recognition of the first gesture. The control circuitry 206 is further configured to set the first configuration of the first hand as a first component of the first gesture and the second configuration of the second hand as a second component of the first gesture. The control circuitry 206 is further configured to utilize or control the first component to control the first controllable device 112A from the plurality of controllable devices 112 and the second component to execute the first action associated with the identified first controllable device 112A.

In accordance with an embodiment, the control circuitry 206 is further configured to track at least one of: a relative movement of the second hand in the second configuration with respect to the first hand in the first configuration, a change in the second configuration of the second hand while the first configuration is maintained, or an independent movement of the second hand in the second configuration while the first configuration of the first hand is maintained. The control circuitry 206 is further configured to control the identified first controllable device 112A to execute a sequence of actions for a specified time period based on a continuous tracking of the relative movement of the second hand, the change in second configuration, the independent movement of the second hand, or a combination thereof. In accordance with an embodiment, the first gesture corresponds to a combination of a voice command and a movement of a set of points in the first sensor data of the first user 114. The control circuitry 206 is further configured to identify the first user 114 based on the cross-correlated information of the first user 114; and determine a position of the first user 114 based on the cross-correlated information of the first user 114.

In accordance with an embodiment, the control circuitry 206 is further configured to modulate control instructions associated with the first controllable device 112A, in a mmWave radio frequency signal of a specified frequency. The control circuitry 206 is further configured to distribute the mmWave radio frequency signal that carries the control instructions to the plurality of cascaded repeater devices 104A to 104N. At least one repeater device of the plurality of cascaded repeater devices 104A to 104N is configured to extract the control instructions, from the mmWave radio frequency signal, and provide the control instructions to the first controllable device 112A that is communicatively coupled to the at least one repeater device. In an example, the specified frequency of the mmWave radio frequency signal is in a range of 55 gigahertz (GHz) to 65 GHz. In another example, the specified frequency of the mmWave radio frequency signal is 60 gigahertz (GHz).

In accordance with an embodiment, the control circuitry 206 is further configured to utilize the trained deep neural network 208A to cross-correlate the first sensor data and the second sensor data to obtain the cross-correlated information. The first sensor data is a spatial point cloud data of a body of the first user 114 and the second sensor data includes a device identity, location information, and signal strength information of the first portable device 106B. The second sensor data is received via at least one of a wireless wide area network signal, a wireless local area network signal, a wireless personal area network signal, or a combination thereof.

In accordance with an embodiment, the control circuitry 206 is further configured to obtain an image of the first user 114 from the image-capture device 106C. The control circuitry 206 is further configured to obtain third sensor data from the plurality of user-devices 106D, . . . , 106N associated with the first user 114 and cross-correlate the image and the third sensor data with the first sensor data and the second sensor data to obtain additional cross-correlated information of the first user 114. In accordance with an embodiment, the control circuitry 206 is further configured to obtain a plurality of radio frequency signals corresponding to different communication protocols from the plurality of communication systems 106. The plurality of communication systems 106 includes at least the radio detection and ranging system 106A, the first portable device 106B, the image-capture device 106C, and the plurality of user-devices 106D, . . . 106N. The control circuitry 206 is further configured to provide access to the first type of communication network 108 to the plurality of communication systems 106 that are communicatively coupled to the cross-correlation system 102 via the plurality of different type of networks 110. The plurality of different type of networks 110 correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network. Each of the plurality of radio frequency signals communicated over a corresponding type of network of the plurality of different type of networks 110 has a defined communication range, where a coverage of the plurality of radio frequency signals corresponding to different communication protocols is extended beyond the defined communication range based on a distribution of a mmWave radio frequency signal of a specified frequency that includes the plurality of radio frequency signals.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A cross-correlation system, comprising:
control circuitry configured to:
input sensor data from a plurality of sensors into an input layer of a deep neural network;
train the deep neural network to:
cross-correlate the sensor data from the plurality of sensors at an input sampling stage;
solve for a relationship between the cross-correlated sensor data and identity of one or more users represented in the cross-correlated sensor data, and
track subsequent movements of the one or more identified users based on the cross-correlated sensor data;
obtain first sensor data of a first user from a radio detection and ranging system, wherein the first sensor data is a spatial point cloud data of a body of the first user;
detect a first portable device carried by the first user based on the first sensor data of the first user;
obtain second sensor data from the first portable device based on the detection of the first portable device of the first user, wherein the second sensor data includes device identity, location information, and signal strength information of the first portable device;
determine location coordinates of the first portable device based on the second sensor data, wherein the location coordinates include at least one of an angle and a distance of the first portable device;
utilize the trained deep neural network to cross-correlate the first sensor data and the second sensor data to:
obtain cross-correlated information of the first user,
identify the first user based on the cross-correlated information of the first user, and
determine a position of the first user based on the cross-correlated information of the first user, wherein coordinates of the spatial point cloud data are merged with the location coordinates of the first portable device;
recognize a first gesture specific to the first user based on the cross-correlated information of the first user;
identify a first controllable device from a plurality of controllable devices and a first action that is to be executed at the identified first controllable device, based on the first gesture; and
control the identified first controllable device to execute the first action based on the first gesture.

2. The cross-correlation system according to claim 1, wherein the control circuitry is further configured to split the first gesture into a first component and a second component, and wherein the first controllable device is identified based on the first component, and the first action is identified based on the second component.

3. The cross-correlation system according to claim 1, wherein the first gesture corresponds to a hand gesture, wherein the control circuitry is further configured to:
detect a first configuration of a first hand and a second configuration of a second hand of the first user; and
determine a joint meaning of the first configuration of the first hand and the second configuration of the second hand specific to the first user for recognition of the first gesture.

4. The cross-correlation system according to claim 3, wherein the control circuitry is further configured to:
set the first configuration of the first hand as a first component of the first gesture and the second configuration of the second hand as a second component of the first gesture; and
utilize the first component to control the first controllable device from the plurality of controllable devices and the second component to execute the first action associated with the identified first controllable device.

5. The cross-correlation system according to claim 3, wherein the control circuitry is further configured to:
track at least one of: a relative movement of the second hand in the second configuration with respect to the first hand in the first configuration, a change in the second configuration of the second hand while the first configuration is maintained, or an independent movement of the second hand in the second configuration while the first configuration of the first hand is maintained; and
control the identified first controllable device to execute a sequence of actions for a specified time period based on a continuous tracking of the relative movement of the second hand, the change in second configuration, the independent movement of the second hand, or a combination thereof.

6. The cross-correlation system according to claim 1, wherein the first gesture corresponds to a combination of a voice command and a movement of a set of points in the first sensor data of the first user.

7. The cross-correlation system according to claim 1, wherein the control circuitry is further configured to modulate control instructions associated with the first controllable device, in a mmWave radio frequency signal of a specified frequency.

8. The cross-correlation system according to claim 7, wherein the control circuitry is further configured to distribute the mmWave radio frequency signal that carries the control instructions to a plurality of cascaded repeater devices, wherein at least one repeater device of the plurality of cascaded repeater devices is configured to extract the control instructions, from the mmWave radio frequency signal, and provide the control instructions to the first controllable device that is communicatively coupled to the at least one repeater device.

9. The cross-correlation system according to claim 7, wherein the specified frequency of the mmWave radio frequency signal is in a range of 55 gigahertz (GHz) to 65 GHz.

10. The cross-correlation system according to claim 7, wherein the specified frequency of the mmWave radio frequency signal is 60 gigahertz (GHz).

11. The cross-correlation system according to claim 1, wherein the second sensor data is received via at least one of: a wireless wide area network signal, a wireless local area network signal, a wireless personal area network signal, or a combination thereof.

12. The cross-correlation system according to claim 1, wherein the control circuitry is further configured to:
obtain an image of the first user from an image-capture device;
obtain third sensor data from a plurality of user-devices associated with the first user; and
cross-correlate the image and the third sensor data with the first sensor data and the second sensor data to obtain additional cross-correlated information of the first user.

13. The cross-correlation system according to claim 12, wherein the control circuitry is further configured to obtain a plurality of radio frequency signals corresponding to different communication protocols from a plurality of communication systems, wherein the plurality of communication systems includes at least the radio detection and ranging system, the first portable device, the image-capture device, and the plurality of user-devices.

14. The cross-correlation system according to claim 13, wherein the control circuitry is further configured to provide access to a first type of communication network to the plurality of communication systems that are communicatively coupled to the cross-correlation system via a plurality of different type of networks.

15. The cross-correlation system according to claim 14, wherein the plurality of different type of networks correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network.

16. The cross-correlation system according to claim 14, wherein each of the plurality of radio frequency signals communicated over a corresponding type of network of the plurality of different type of networks has a defined communication range, wherein a coverage of the plurality of radio frequency signals corresponding to different communication protocols is extended beyond the defined communication range based on a distribution of a mmWave radio frequency signal of a specified frequency that includes the plurality of radio frequency signals.

17. The cross-correlation system according to claim 1, wherein the trained deep neural network is utilized to identify the first user based on the cross-correlated information of the first user even if the first user is in movement or even if a body shape of the first user is changed.

18. A cross-correlation method, comprising:
inputting by control circuitry, sensor data from a plurality of sensors into an input layer of a deep neural network;
training, by the control circuitry, the deep neural network for:
cross-correlating the sensor data from the plurality of sensors at an input sampling stage;
solving for a relationship between the cross-correlated sensor data and identity of one or more users represented in the cross-correlated sensor data, and
tracking subsequent movements of the one or more identified users based on the cross-correlated sensor data;
obtaining, by the control circuitry, first sensor data of a first user from a radio detection and ranging system, wherein the first sensor data is a spatial point cloud data of a body of the first user;
detecting, by the control circuitry, a first portable device carried by the first user based on the first sensor data of the first user;
obtaining, by the control circuitry, second sensor data from the first portable device based on detection of the first portable device of the first user, wherein the second sensor data includes device identity, location information, and signal strength information of the first portable device;
determining location coordinates of the first portable device based on the second sensor data, wherein the location coordinates include at least one of an angle and a distance of the first portable device;
utilizing the trained deep neural network to cross-correlate, by the control circuitry, the first sensor data and the second sensor data for:
obtaining cross-correlated information of the first user,
identifying the first user based on the cross-correlated information of the first user, and
determining a position of the first user based on the cross-correlated information of the first user, wherein coordinates of the spatial point cloud data are merged with the location coordinates of the first portable device,
recognizing, by the control circuitry, a first gesture, specific to the first user based on the cross-correlated information of the first user;
identifying, by the control circuitry, a first controllable device from a plurality of controllable devices and a first action that is to be executed at the identified first controllable device, based on the first gesture; and
controlling, by the control circuitry, the identified first controllable device to execute the first action based on the first gesture.

19. A non-transitory computer-readable medium having stored thereon, computer implemented instructions, which when executed by a computer in a communication apparatus, causes the communication apparatus to execute operations, the operations comprising:
inputting by control circuitry, sensor data from a plurality of sensors into an input layer of a deep neural network;
training, by the control circuitry, the deep neural network for:
cross-correlating the sensor data from the plurality of sensors at an input sampling stage;

solving for a relationship between the cross-correlated sensor data and identity of one or more users represented in the cross-correlated sensor data, and tracking subsequent movements of the one or more identified users based on the cross-correlated sensor data;

obtaining, by the control circuitry, first sensor data of a first user from a radio detection and ranging system, wherein the first sensor data is a spatial point cloud data of a body of the first user;

detecting, by the control circuitry, a first portable device carried by the first user based on the first sensor data of the first user;

obtaining, by the control circuitry, second sensor data from the first portable device based on detection of the first portable device of the first user, wherein the second sensor data includes device identity, location information, and signal strength information of the first portable device;

determining location coordinates of the first portable device based on the second sensor data, wherein the location coordinates include at least one of an angle and a distance of the first portable device;

utilizing the trained deep neural network to cross-correlate, by the control circuitry, the first sensor data and the second sensor data for:

obtaining cross-correlated information of the first user, identifying, by the control circuitry, the first user based on the cross-correlated information of the first user, and determining, by the control circuitry, a position of the first user based on the cross-correlated information of the first user, wherein coordinates of the spatial point cloud data are merged with the location coordinates of the first portable device, recognizing, by the control circuitry, a first gesture, specific to the first user based on the cross-correlated information of the first user;

identifying, by the control circuitry, a first controllable device from a plurality of controllable devices and a first action that is to be executed at the identified first controllable device, based on the first gesture; and controlling, by the control circuitry, the identified first controllable device to execute the first action based on the first gesture.

\* \* \* \* \*